Nov. 20, 1951  W. GANZ  2,576,068
MACHINE FOR MAKING COTTON TIPPED APPLICATORS
Filed Nov. 17, 1947  16 Sheets-Sheet 1

INVENTOR.
William Ganz
BY George H. Lorch
ATTORNEY

Nov. 20, 1951  W. GANZ  2,576,068
MACHINE FOR MAKING COTTON TIPPED APPLICATORS
Filed Nov. 17, 1947  16 Sheets-Sheet 2

INVENTOR.
William Ganz
BY George H. Loeb
ATTORNEY

Nov. 20, 1951 W. GANZ 2,576,068
MACHINE FOR MAKING COTTON TIPPED APPLICATORS
Filed Nov. 17, 1947 16 Sheets-Sheet 4

INVENTOR.
William Ganz
BY George H. Lorch
ATTORNEY

Nov. 20, 1951 W. GANZ 2,576,068
MACHINE FOR MAKING COTTON TIPPED APPLICATORS
Filed Nov. 17, 1947 16 Sheets-Sheet 5
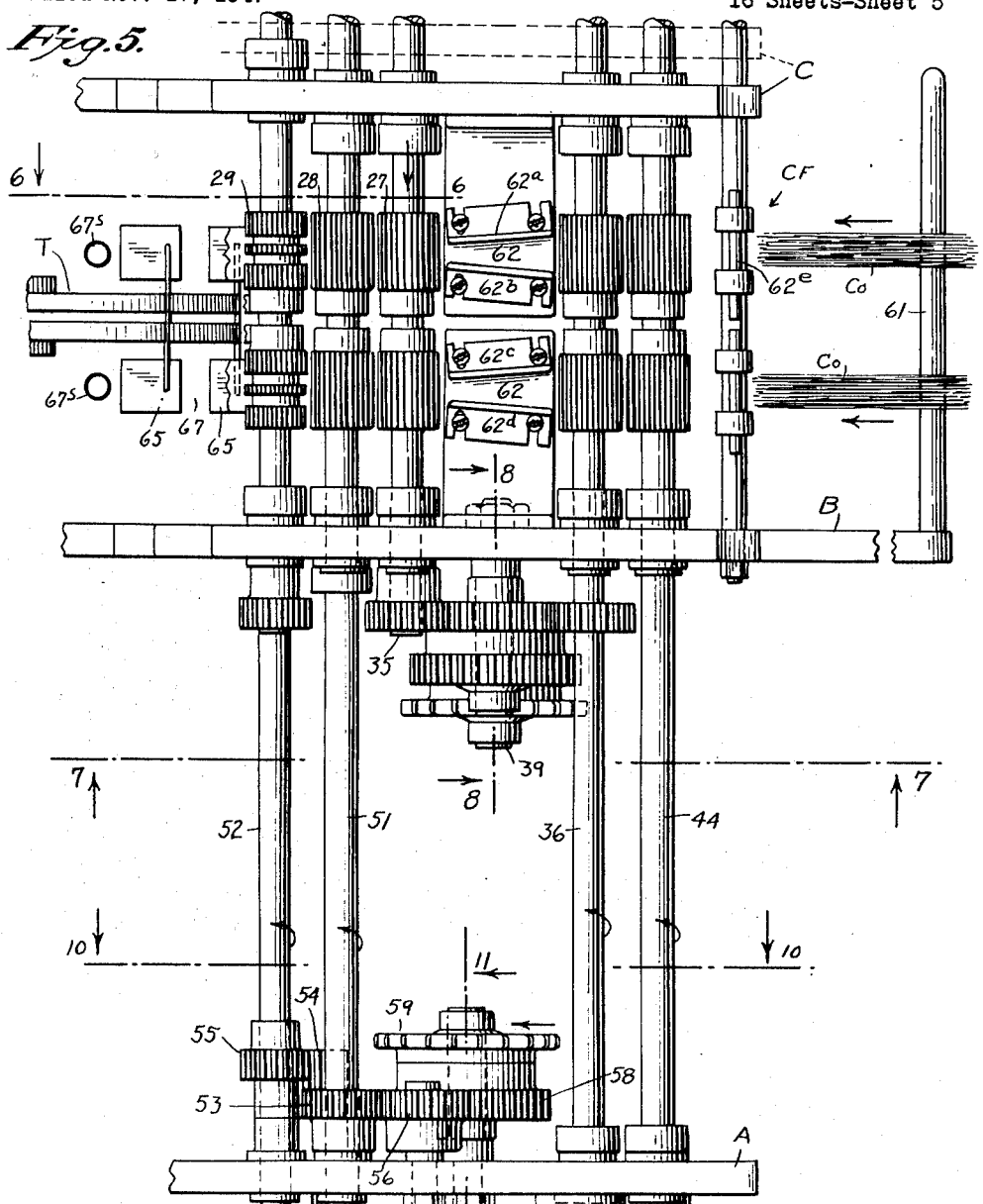
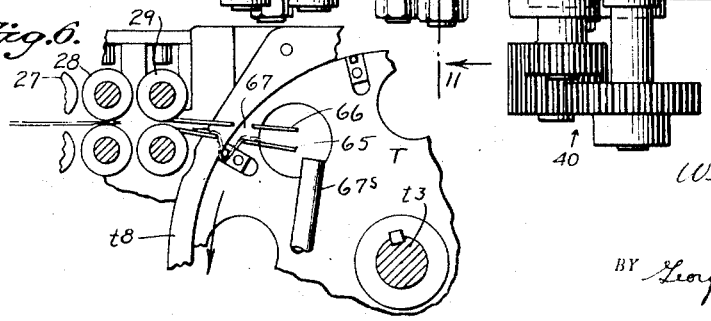
INVENTOR.
William Ganz
BY George H. Lorch
ATTORNEY

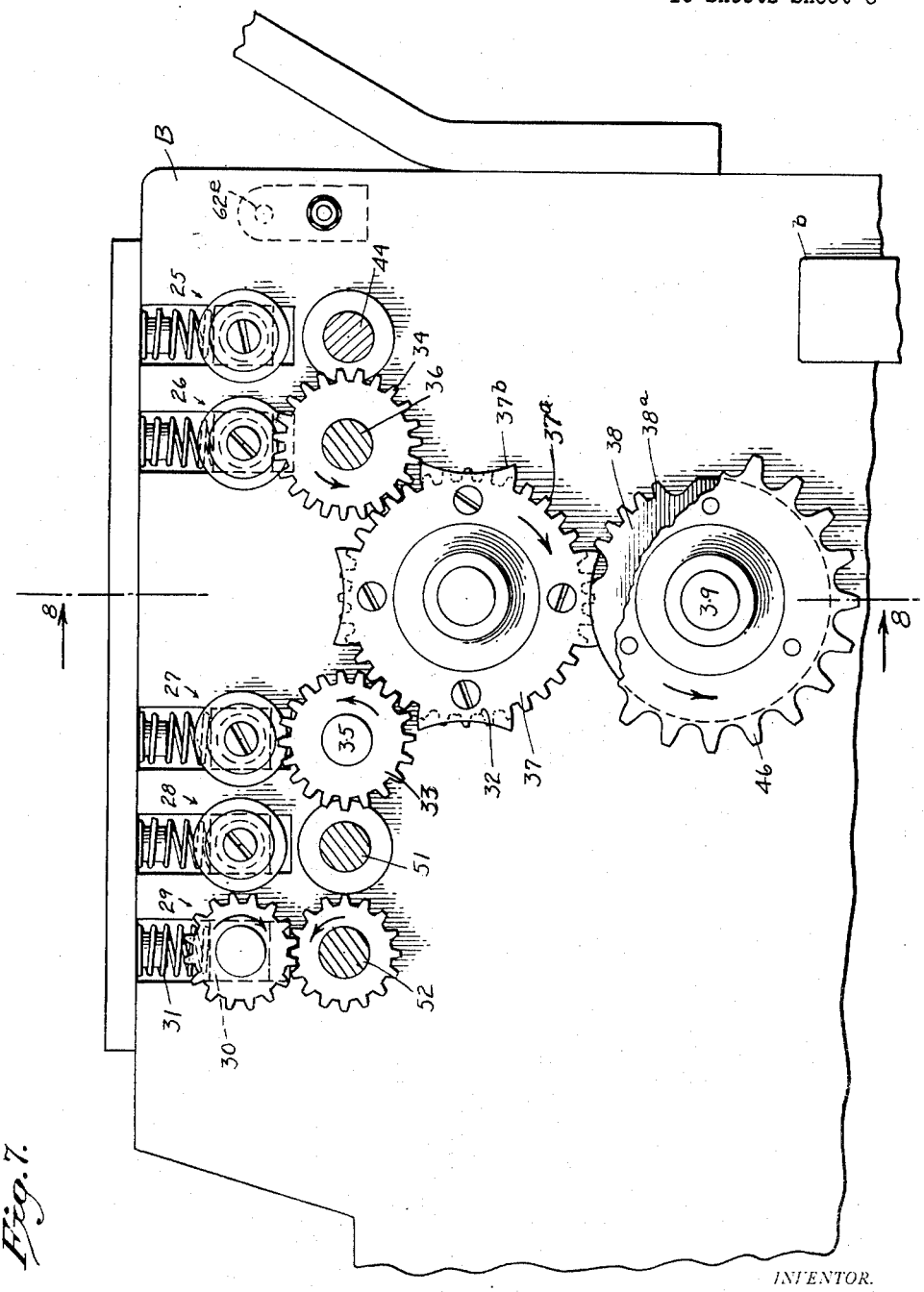

Nov. 20, 1951  W. GANZ  2,576,068
MACHINE FOR MAKING COTTON TIPPED APPLICATORS
Filed Nov. 17, 1947  16 Sheets-Sheet 7

INVENTOR.
William Ganz
BY George H. Loich
ATTORNEY

Nov. 20, 1951 W. GANZ 2,576,068
MACHINE FOR MAKING COTTON TIPPED APPLICATORS
Filed Nov. 17, 1947 16 Sheets-Sheet 8

INVENTOR.
William Ganz
BY George H. Lorch
ATTORNEY

Nov. 20, 1951 W. GANZ 2,576,068
MACHINE FOR MAKING COTTON TIPPED APPLICATORS
Filed Nov. 17, 1947 16 Sheets-Sheet 10

INVENTOR.
William Ganz
BY George H. Lorch
ATTORNEY

Nov. 20, 1951 W. GANZ 2,576,068
MACHINE FOR MAKING COTTON TIPPED APPLICATORS
Filed Nov. 17, 1947 16 Sheets-Sheet 11
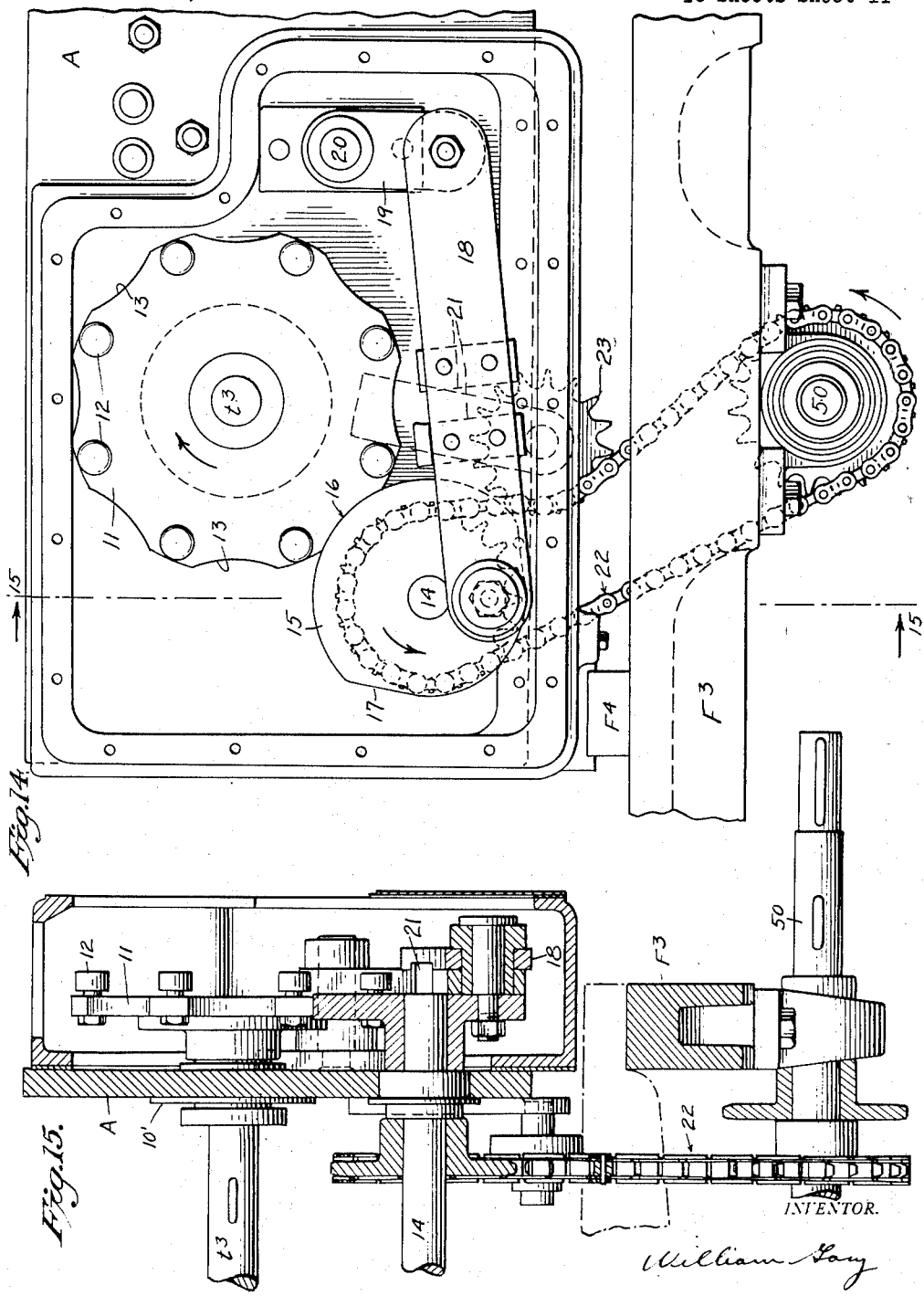

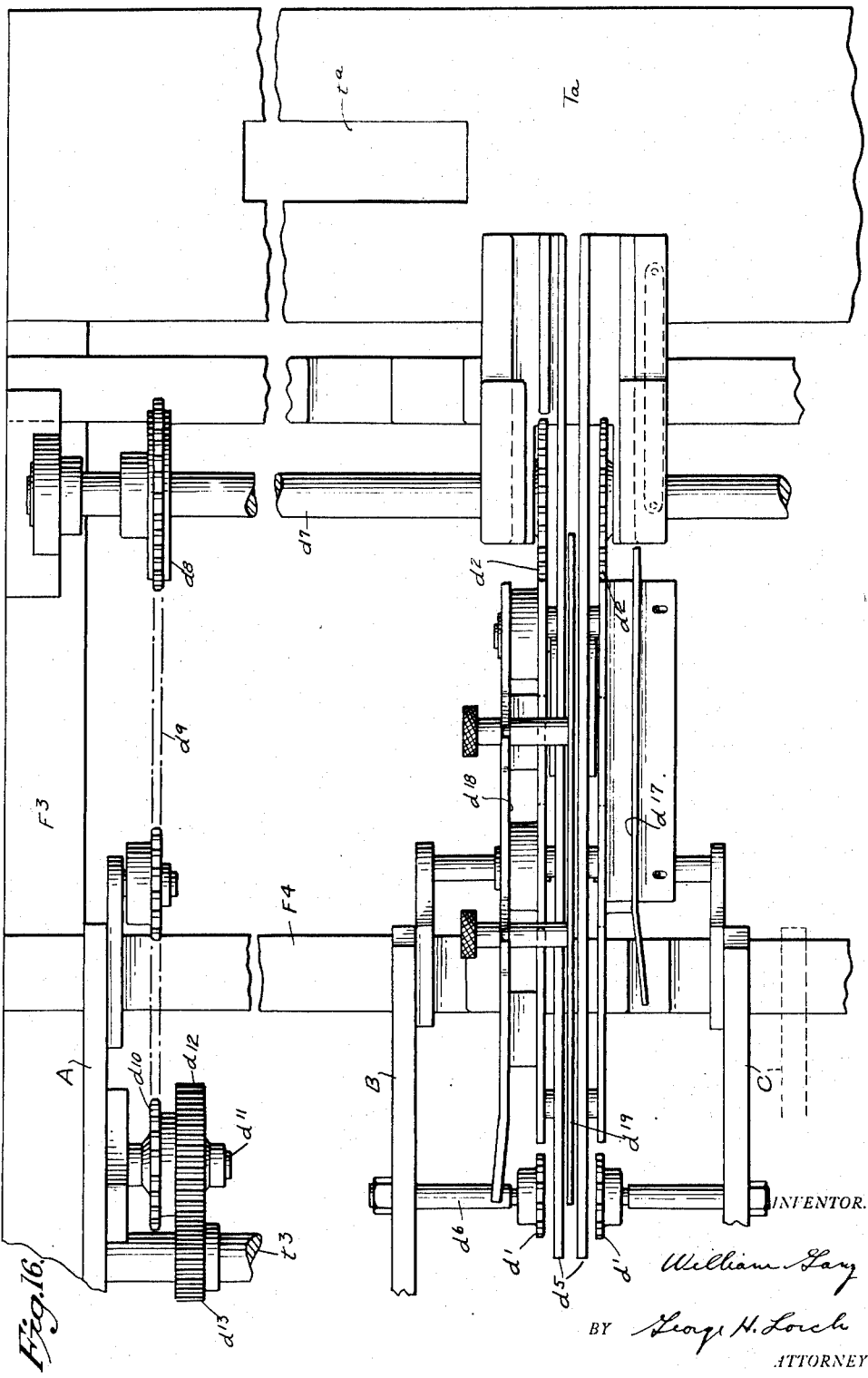

Nov. 20, 1951 W. GANZ 2,576,068
MACHINE FOR MAKING COTTON TIPPED APPLICATORS
Filed Nov. 17, 1947 16 Sheets-Sheet 13

INVENTOR.
William Ganz
BY George H. Lorch
ATTORNEY

Nov. 20, 1951  W. GANZ  2,576,068
MACHINE FOR MAKING COTTON TIPPED APPLICATORS
Filed Nov. 17, 1947  16 Sheets-Sheet 14

INVENTOR.
William Ganz
BY George H. Lorch
ATTORNEY

Nov. 20, 1951 W. GANZ 2,576,068
MACHINE FOR MAKING COTTON TIPPED APPLICATORS
Filed Nov. 17, 1947 16 Sheets-Sheet 15

INVENTOR.
William Ganz
BY George H. Loich
ATTORNEY

Nov. 20, 1951     W. GANZ     2,576,068
MACHINE FOR MAKING COTTON TIPPED APPLICATORS
Filed Nov. 17, 1947     16 Sheets—Sheet 16

INVENTOR.
William Ganz
BY George H. Lorch
ATTORNEY

Patented Nov. 20, 1951

2,576,068

UNITED STATES PATENT OFFICE 2,576,068

MACHINE FOR MAKING COTTON TIPPED APPLICATORS

William Ganz, Teaneck, N. J., assignor to Johnson & Johnson, a corporation of New Jersey Application November 17, 1947, Serial No. 786,434

16 Claims. (Cl. 19—149)

The present invention relates to the making of cotton tipped applicators and is concerned more particularly with an improved method of wrapping a patch of cotton on the end of the stick and with a fully automatic machine operative to carry out the method efficiently and expeditiously.

A primary aim of the invention is the attainment of a high degree of uniformity in the size, density, and shape of the completed swab and to obtain a firm and secure gripping of the cotton to the stick end.

The herein disclosed method of making cotton tipped applicators includes the steps of drafting or stretching of the cotton somewhat in ribbon form and detaching pieces of a size suitable for swabs. Thereafter the patches of cotton are positioned in the path of a laterally moving stick which partially wraps the cotton about itself as it moves into the bight of stick twirling and cotton forming rolls. The rolls are preferably rubber tired at their ends where they engage the middle of the stick, i. e., frictionally engage and give the stick and cotton a twirling motion. The forming rolls are recessed annularly in a manner such that the space between peripheries of two adjacent rolls is approximately wedge or pear shaped with the larger end of the wedge closed, or nearly so, and with the smaller end of the opening extending toward the rubber tired drivers, i. e., the center of the stick, and partially telescoping or overlapping the end of the stick positioned therebetween. As the forming rolls engage one or both ends of the stick and its cotton, the stick and cotton are given a twirling motion which in connection with the rotating forming rolls, rolls the cotton onto one or both ends of the stick. However, by means of a slight speed differential between the surface of the stick driving portion of the rolls and the surface of the annularly grooved swab shaping or forming portion of the rolls, the patch of cotton is caused to become tightly wrapped upon the stick and the excess gradually worked outwardly toward the end of the stick whereby there is formed an enlarged blunt, pear shaped head of cotton having a tightly wrapped core on the stick. By this improved method of wrapping or rolling the cotton upon the stick, the stick is twirled within a wad of twirling cotton as distinguished from a wad of stationary cotton, and the slightly faster surface speed of the small diametered stick relative to the surface speed of the larger diametered wad of cotton, has the effect of producing not only a tightly wound core, but also of further drawing out the individual cotton fibres so that a bunching-up or one-sided formation of the swab is prevented. Where, for example, stationary cotton wads are applied by the fingers to twirling sticks, a bunching of the cotton on one side of the stick is difficult if not impossible to avoid with the result that the finished swabs lack uniformity in shape and texture, and are exceedingly difficult to handle in actual use. In a similar way the prior automatic cotton applying machines tend to produce swabs that are lacking in uniformity in size and texture for in such known machines the stick is twirled within a stationary structure containing cotton and matting up or one-sided swab formations cannot be avoided.

The present invention further undertakes to provide a power-driven machine operative automatically to feed sticks from a bulk source successively into position between revolving pairs of stick rotating and cotton rotating and shaping rolls, and upon completion of the wrapping or swab forming operation, to deliver the completed swabs into boxes or suitable containers without manual handling.

Still a further object of the invention is to render available a machine capable of performing the above explained wrapping or forming method on one end or on both ends of a swab stick, and as a further refinement, a machine adaptable to perform the method on sticks of various lengths with the making of but a few simple adjustments to the machine.

Still another objective of the invention is the construction of a swab stick making machine that is simple to operate and control and which requires a minimum of attention other than keeping it supplied with materials and the removal of the packaged swabs, and one which, with due regard to the delicateness of the slender sticks to be handled and the wispy nature of the cotton to be processed, is constructed for continuous operation, without fouling, for long periods of time.

In the carrying out of the aims and objectives of the invention it is proposed to construct a machine composed essentially of four interrelated and cooperative groups of mechanisms, namely, a hopper and stick feeding group; a cotton drafting or stretching, severing and feeding group; a stick twirling and swap shaping group; and a swab delivery and packaging group. It is further proposed to arrange the aforementioned groups of mechanisms on a frame work in a manner constituting a substantially complete entity, and preferably to arrange two similar groups of such mechanisms side-by-side on adjustable frames so that when desired, one or both ends of sticks of different lengths may have a swab applied thereto. The two similar groups of mechanisms are preferably mounted upon a single main frame and driven in synchronism from a common source of power. A master control switch and two auxiliary control switches conveniently located are provided for controlling the cycle of operations.

The machine also embodies a rotatable drum element having stick receiving recesses in its periphery that operates to transport sticks from a loading hopper to a position between the stick twirling and swab forming rolls and thence to a delivery station where they are automatically discharged upon a conveyor. The conveyor carries the finished cotton tipped applicators away from the drum and deposits them cumulatively upon a pick up shelf. At this point, means are provided, preferably in the form of a vacuum head, to remove a predetermined number of swabs from the shelf and to carry them to a packaging mechanism. The packaging mechanism is, of course, synchronized with the operation of the swab making and delivery mechanisms to insure timely removal of the finished applicators and complete count of the packaged swabs. In the instant embodiment, the packaging mechanism operates once for each 10 swab making cycles, and 10 finished applicators are deposited in a collector trough on each operation of the pick-up head.

The machine is designed to have one or more previously carded strips or slivers of cotton fed through successive pairs of intermittently movable drafting or stretching rolls and finally through the bight of intermittently driven and continuously driven rolls which detach a patch from the strip of cotton and cause the patch to be projected to a position lying across the path of movement of the sticks carried on the drum. Also, before the sticks reach the successive patches of cotton, a slight amount of adhesive is applied to the ends thereof to insure permanency in the adhering of the cotton to the stick. During the actual wrapping of the cotton upon the stick, a cotton moistening agent or a liquid medicament may be applied which further aids the shaping of the cotton wad into a neat appearing swab.

To operate the machine it is necessary only to supply the stick hopper with sticks, fill the adhesive and liquid moistening reservoirs with material, and supply and insert the ends of the cotton slivers into the bight between the leading pair of cotton rolls. As soon as the sticks and cotton patches are brought into operative positions, the wrapping or rolling of the cotton to the stick ends commences and continues successively and uninterruptedly until the machine is shut down. Meanwhile, the attendant stations himself at the delivery end of the machine and applies empty containers and removes filled containers from the machine.

When it is desired to form swabs on one end only of the stick, only one side of the machine is supplied with a cotton ribbon. When longer or shorter swab sticks are to be made on the machine one or both of the frame-work members that journal and support the various rolls, shafts, sides of the stick hopper, etc., are adjusted away or toward each other accordingly, and on again securing the frame structures in position, the machine is operated as before.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure, and in such drawings, like characters of reference denote corresponding parts throughout all the views, of which:

Fig. 5 is an enlarged top plan view of the cotton feeding mechanism shown in Figs. 1 and 2.

Fig. 6 is a detail sectional view on the line 6—6 of Fig. 5 showing a stick sweeping through a detached length of cotton.

Fig. 7 is a vertical section on the line 7—7 of Fig. 5 showing the rollers for feeding the cotton strip, drafting and detaching a length therefrom, and the drive for same.

Fig. 14 is an enlarged detail elevation of the turret driving mechanism indicated in dotted lines in Fig. 2, and with casing cover removed.

Fig. 15 is a vertical section on the line 15—15 of Fig. 14.

Fig. 16 is a plan view of the conveyor mechanism and drive for same.

Main frame

Figure 1:
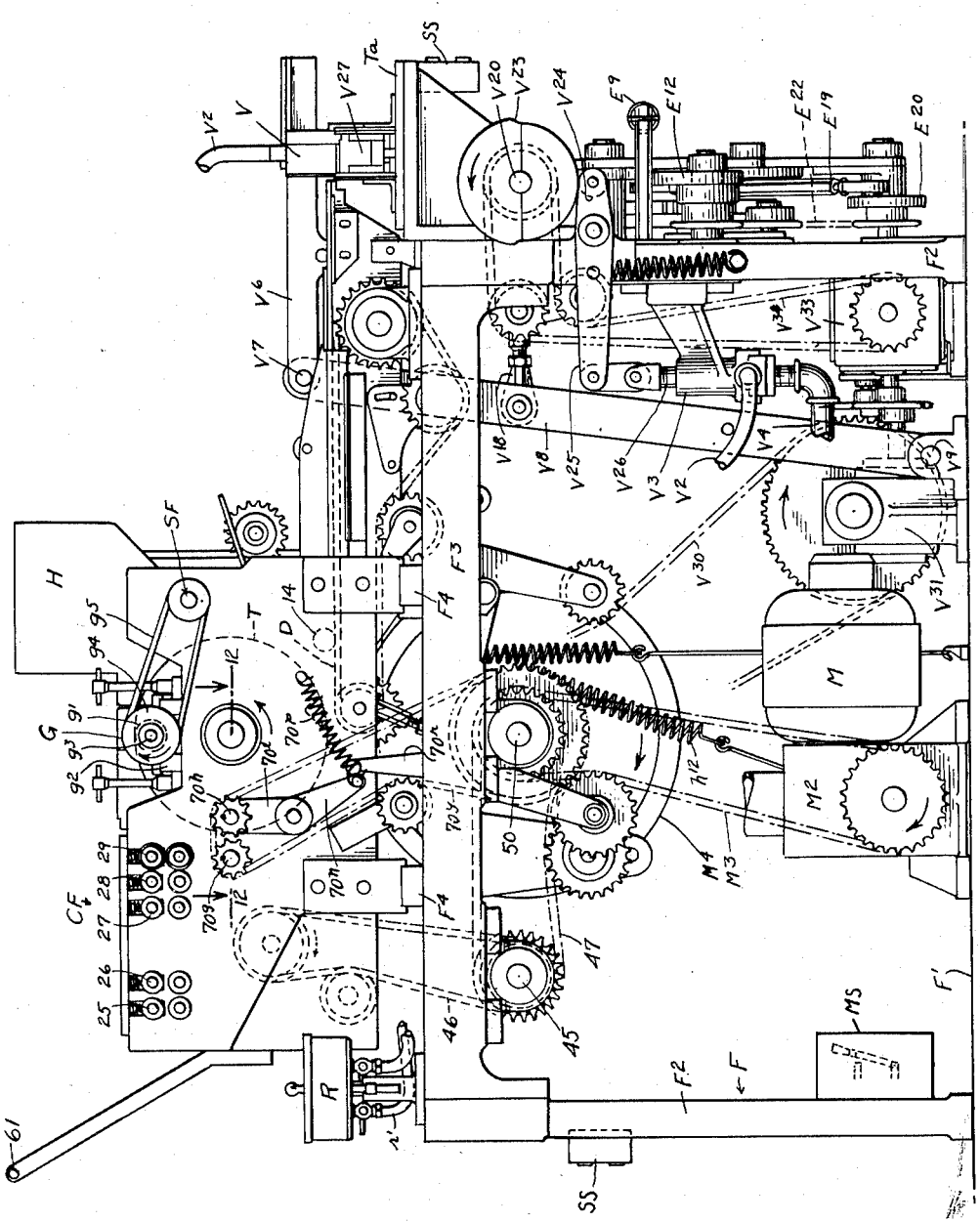
Fig. 1 is an elevation of the right side of the machine.

Referring more particularly to the structure disclosed in Fig. 1, the machine embodies a main frame F, which includes a base member F1, upstanding corner supports F2, lengthwise extending horizontal girders F3 mounted atop the corner supports, and horizontal cross-stay members F4 mounted upon the girders, the several members being all bolted or otherwise securely fastened together to form a sturdy, rigid, boxlike frame adapted to house and support the various mechanisms hereinafter mentioned.

Auxiliary frame

On top of the stay members F4 and lying in parallel spaced planes normal to the plane of the stay members, are three bearing plate members A, B, and C (see Fig. 3), each of which is formed with an extending footing $a$, $b$, etc. (Figs. 3 and 13) adapted to be clamped normally in fixed position to the cross-stays F4. The outer bearing plate C, for a purpose later explained, is constructed and mounted for adjustments across the cross-stays whereby to increase or decrease the space between plates B and C.

Figure 4:
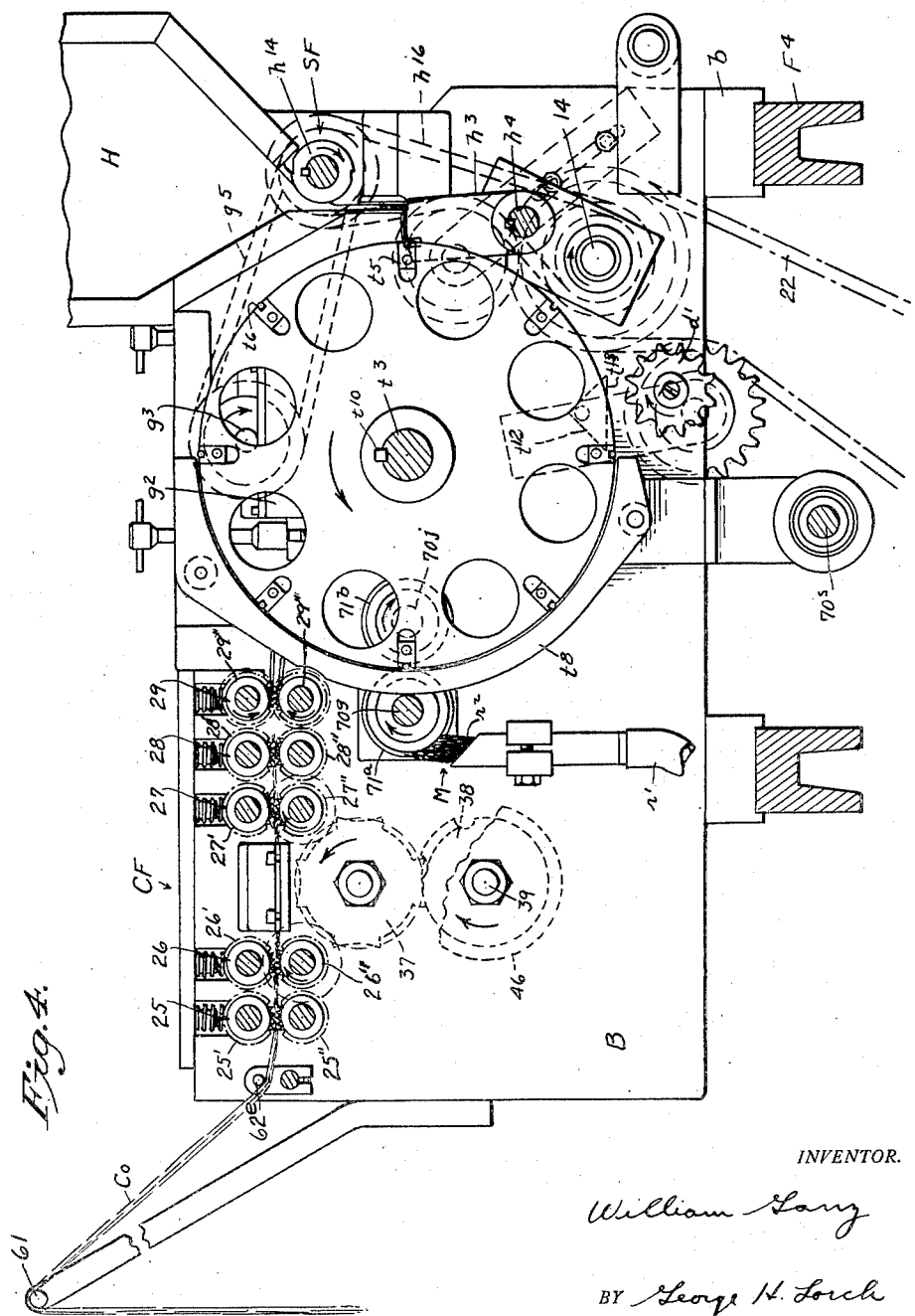
Fig. 4 is an enlarged central vertical section of the upper part of the machine on the line 4—4 of Fig. 3.

The auxiliary frame, comprising bearing plates A, B, and C, supports a laterally extendible stick hopper H, stick feeding mechanism indicated generally by the legend SF, an indexible and laterally expansible stick carrier T, cotton feeding mechanisms indicated at CF, gluing, moistening and delivery mechanisms indicated at G, M, and D respectively (Figs. 1 and 4). These mechanisms will now be explained.

Figure 13:
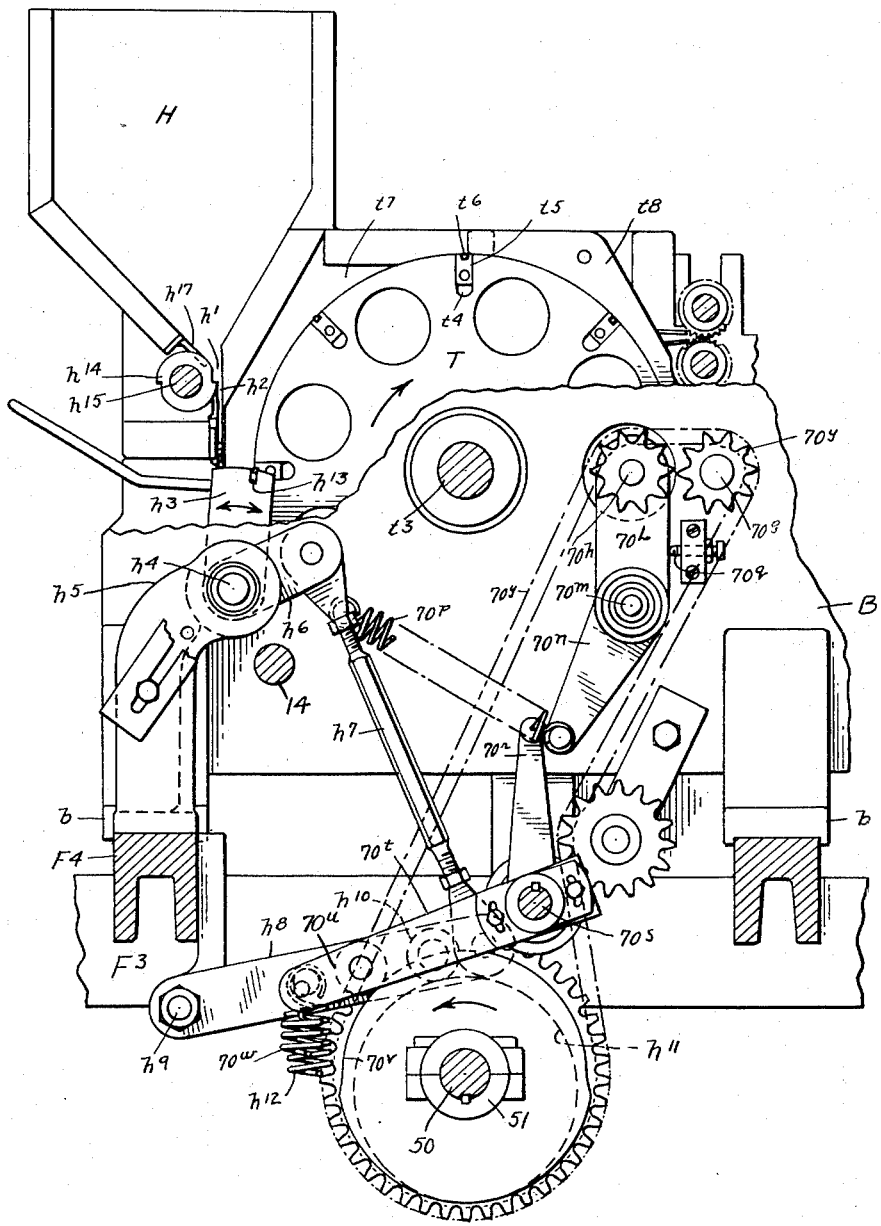
Fig. 13 is an enlarged detail vertical section on the line 13—13 of Fig. 3 showing the feed mechanism for the sticks, and the pressure release mechanism for the forming rollers.

Stick feeding mechanism—Figs. 1, 4, 13

The stick hopper H is constructed of two telescopingly arranged end plates, each supported by one of the bearing plates B and C, as to be adjustable laterally therewith. The hopper is provided at its bottom with a relatively narrow throat opening $h^1$ that communicates with a vertically disposed passageway $h^2$. Underlying the passageway $h^2$ is an oscillatable, notched barrier and transfer member $h^3$. The barrier member is mounted upon a shaft $h^4$ journaled in bearings $h^5$ that are supported upon one of the cross-stays F4 of the main frame. Also secured to the shaft $h^4$ is a lever $h^6$, which in turn is connected by link $h^7$ to the end of the pivoted lever $h^8$. The lever $h^8$ is pivoted at $h^9$ to the main frame F and carries intermediate its ends a cam follower $h^{10}$. A main drive shaft 50, journaled in bearings 51 provided by the main frame, extends across the machine and carries a stick feeding actuating cam $h^{11}$ whose contoured periphery actuates the follower $h^{10}$ to effect oscillatory movement of the barrier member $h^3$. A tension spring $h^{12}$, connected between the pivoted lever $h^8$ and a stationary part of the frame, maintains the follower $h^{10}$ in contact with the cam $h^{11}$. The peripheral surface of the barrier member is curved and formed with a transverse recess $h^{13}$, which on oscillation of the barrier, incident to a rotary movement of the main cam shaft 50, is brought first to a position underlying the hopper passageway $h^2$ and thence to a position laterally removed and into substantial alignment with a stick receiving recess $t^6$ in the indexible carrier T. To prevent jamming of the sticks in the throat of the hopper, a clearing device is provided which is disclosed herein in the form of a rotatable toothed wheel $h^{14}$. A transverse shaft $h^{15}$ carries the wheel $h^{14}$ and is driven by a sprocket and chain mechanism $h^{16}$ from a shaft 14. The shaft 14 is journaled in bearings provided by the upstanding plate members A, B, and C, and receives its power from the main shaft 50, via chain and sprocket drive indicated at 22. Suffice it for the present to note that the toothed wheel $h^{14}$ (Fig. 13) has its periphery inserted in an opening formed in the side of the hopper throat to the extent that a passageway slightly larger than the diameter of a stick is formed between the wheel periphery and the opposite wall of the hopper. It is to be noted further, that the toothed wheel $h^{14}$ is caused to be driven in a counterclockwise direction (as viewed in Fig. 13) so that its toothed rim picks up excess sticks that may accumulate in the leading end of the passageway $h^2$ and carries them back into the hopper. The returned sticks are stripped from the wheel by one or more tangentially disposed fingers $h^{17}$ that lie in shallow annular grooves formed in the surface of the wheel $h^{14}$. The passageway $h^2$ is given a width such that the sticks may fall therein and lie one on top of each other as illustrated in Fig. 13, until they are picked off one-by-one, from the bottom, by the barrier and transfer member $h^3$ and transferred to the carrier cavities $t^6$.

Stick carrier—Figs. 1, 4, 5, 6, 12, 13

The stick carrier, indicated generally by the legend T, is composed preferably of two discs $t^1$ that are secured by screws $t^{11}$ to flanged hubs $t^2$ which in turn are normally secured fast to an indexible shaft $t^3$. The outer rims of the discs are formed with a series of equi-spaced recesses $t^4$ into which recessed stick receiving blocks $t^5$ are placed and locked in position. The outer edge of each of the blocks $t^5$ is formed with a stick receiving recess $t^6$ which, at the period of dwell between index movements, is aligned with the stick in the transfer member $h^3$ of the stick feeding mechanism. The carrier is intermittently rotated in a counterclockwise direction (Fig. 4) to move it to eight stations only four of which are effective. In the position illustrated in Fig. 4, the transfer member $h^3$ has placed a stick in one of the recesses $t^6$ of the carrier and the latter is about to carry it upwardly out of the slot $h^{13}$ to the next station. Two indexing movements bring the stick to the station at the top of the drawing where a pair of paste rollers $g^1$ apply a slight amount of glue to each end of the stick. Two further indexing movements carry the stick through a cotton patch receiving zone and into the bight of the stick twirling and swab forming rollers, and two further movements brings the stick to the lowermost position illustrated in Fig. 4 where it is delivered upon a conveyor mechanism D. Two stationary guide rims $t^7$ and $t^8$ are mounted on the frame members and extend about the periphery of each carrier disc from the stick loading station to the stick delivery station and effectively close the open sides of the stick recesses $t^6$ during that portion of the path of stick travel.

Figure 12:
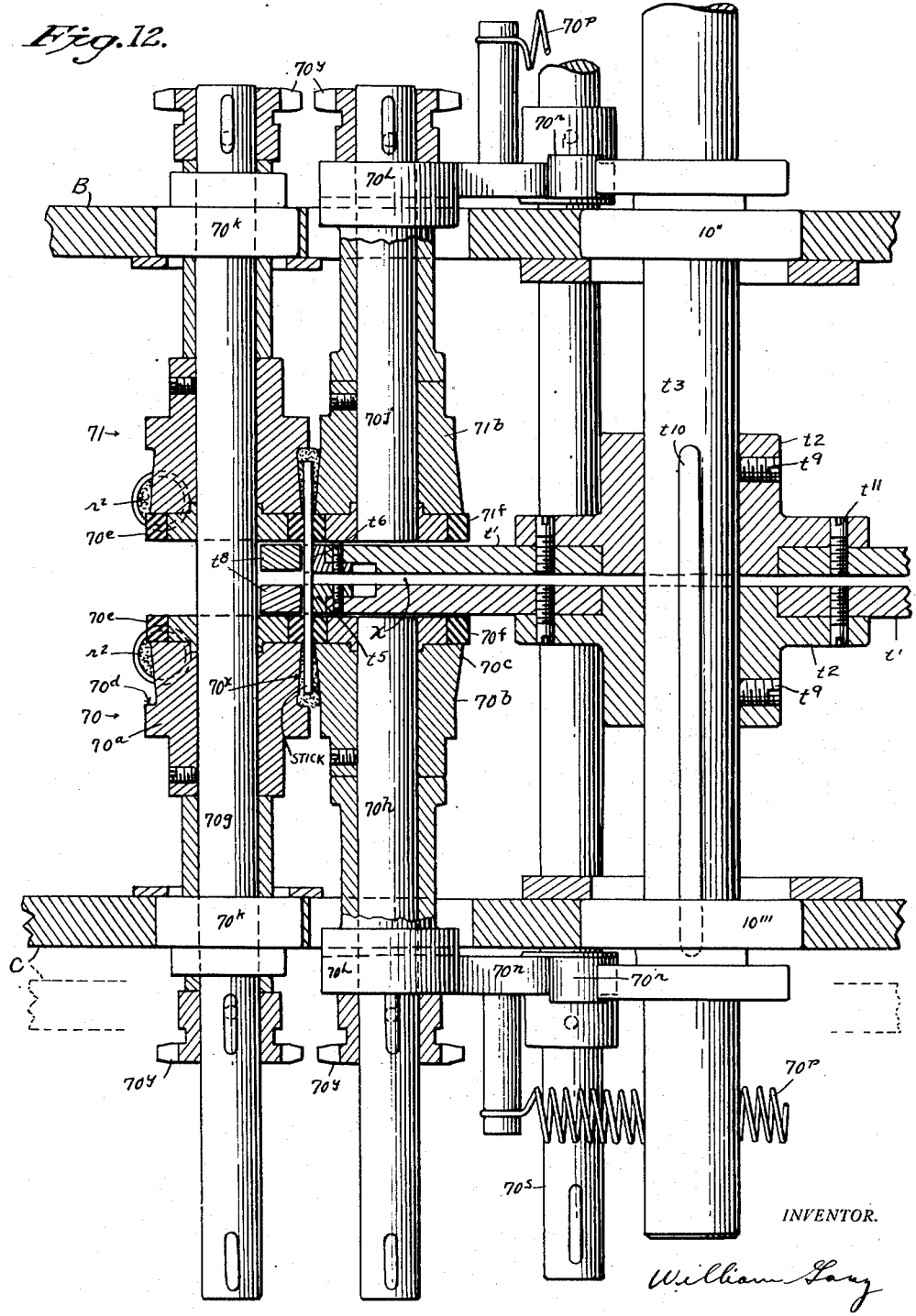
Fig. 12 is an enlarged horizontal section on the line 12—12 of Fig. 1 showing the forming operation.

As illustrated more clearly in Fig. 12, there are two carrier discs $t^1$ and two sets of guide rims $t^7$ and $t^8$ spaced a pre-selected distance $x$ apart. The spacing of the discs is determined by the length of sticks to be processed. To afford means for adjusting the discs axially along the shaft $t^3$, the flanged hubs $t^2$ of the carrier are splined to the shaft and adapted for axial movement there-along. Set screws $t^9$ are provided to hold the discs in the selected position, while the shaft splines $t^{10}$ maintain the carrier discs in phase. Likewise, the stick carrying blocks $t^5$ are designed and adapted for easy removal from the carrier for replacement or interchange with others of a different capacity, i. e., for larger or smaller diametered sticks.

*Carrier indexing mechanism—Figs. 2, 12, 14, and 15*

The carrier shaft $t^3$ is journaled in anti-friction bearings $10^1$, $10^{11}$ and $10^{111}$ in the frames A, B and C respectively and carries at its end, outside of frame A, a star wheel 11 that forms part of a Geneva-index mechanism. Any suitable Geneva mechanism, capable of imparting intermittent movement to the carrier is satisfactory. There is illustrated a modified form of such a movement in Fig. 14 in which the star wheel is provided with eight equally spaced propelling rolls 12 and eight intermediately located locking portions 13 about its periphery. The star wheel driver is mounted upon a parallel shaft 14 and comprises a disc 15 whose rim portion 16 is curved to match the locking portions of the star wheel. The curved rim 16 extends about one-half the circumference of the driver, and the remaining rim portion 17 is reduced in diameter to an extent necessary to clear the arms of the star wheel.

A crank lever 18 is pivoted at one end to the face of the crank disc 15, eccentric thereof, and at its other end to a second pivoted lever 19. The lever 19 is pivoted as at 20 to the plate A. Two roll actuating blocks 21 are secured to the inner face of the lever 18, intermediate its ends, and positioned in spaced apart relation to receive therebetween the rolls 12 in succession. As the crank disc revolves, the lever 18 is moved endwise and arcuately, the arcuate movement brings the blocks in roll-receiving position and the endwise movement of the lever, effects a shifting of the inter-engaged roller 12 one station. As the lever 18 drops and the roller 12 is about to leave the slot between the blocks 21, the concentric portion 16 of the crank disc 15 is about to enter one of the locking portions 13 of the star wheel. When correctly timed and related the crank disc locks the star wheel between the periods of movement caused by the orbital movement of the lever 18. In this way, the star wheel is given an intermittent movement from a continuously rotating shaft 14.

Rotary motion is imparted to the shaft 14 by means of a chain and sprocket drive, indicated at 22, initiating from the main shaft 50. An idler sprocket 23, operatively engaging the chain on its slack side is provided to keep the chain reasonably tight and the mechanism correctly timed.

*Cotton feeding mechanism—Figs. 1, 4, 5, 6, 7, 10 and 11*

The cotton feeding mechanism indicated generally at CF (Fig. 1) includes, in the instant embodiment, five pairs of feeding and drafting rollers 25 to 29 for each ribbon of cotton. Referring more particularly to Figs. 4 and 5, each pair of rollers includes an upper idler roller 25', 26', 27' etc., and a lower driving roller 25'', 26'', 27'' etc., arranged on parallel shafts journaled in the frames A, B, and C. The shaft of each of the upper rollers 25', 26', 27' etc., is mounted in a yieldable bearing block 30 at each end, which block is spring pressed by a spring 31 (Fig. 7) towards its lower corresponding roller 25'', 26'', 27'' etc., respectively. Each roller of the five pairs of rollers is longitudinally ribbed and mounted on its shaft so that the ribs thereof interdigitate with the ribs of its corresponding roller. The cotton ribbon, it will be observed, passes between pairs of rollers, whose interdigitating teeth cause a slight transverse crimping of the ribbon and provide the necessary grip to draft the cotton sliver.

As illustrated in Fig. 5, there are two gangs of cotton feed rollers coaxially arranged on their respective driving and idler shafts.

The leading three pairs of rollers 25, 26 and 27 are propelled intermittently and the trailing two pairs 28 and 29 are driven continuously. Furthermore, the pairs of rollers are driven at slightly increased rates over the rate of the speed of the preceding pair in the direction of travel of the cotton. The purpose of the non-uniform movement is to draft the cotton sliver and then to detain bits or patches of cotton.

Figure 9:
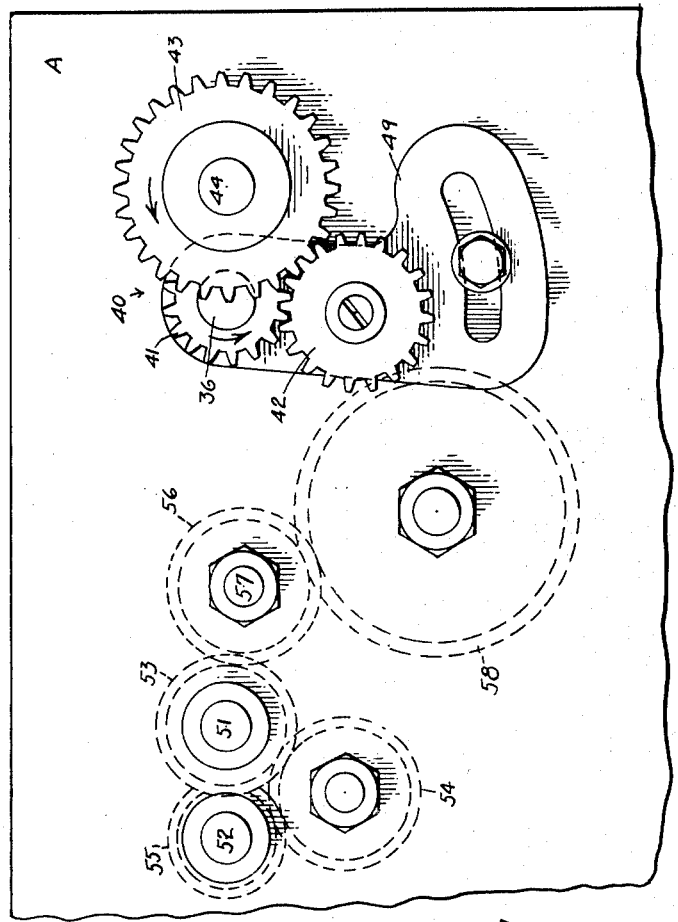
Fig. 9 is an enlarged detail elevation of the upper right end of Fig. 2.
Figure 8:
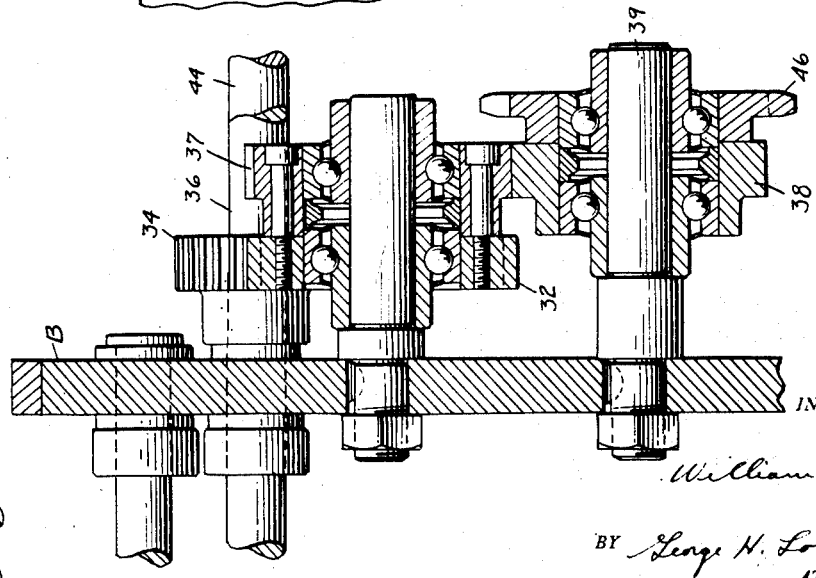
Fig. 8 is a vertical section on the line 8—8 of Figs. 5 and 7.

The intermittently driven series of rollers derive their motion from any suitable Geneva driven gear such as gear 32 (Fig. 7) which meshes with gears 33 and 34 on the roller shafts 35 and 36. The Geneva wheel 37, which is secured to the gear 32 is driven from an interrupted toothed gear 38 journaled on a shaft 39. The Geneva 37 is furnished with four toothed sectors 37a and four locking arcs 37b, whereas the driver 38 is furnished with one toothed sector 38a whereby each full turn of the driver 38 effects a quarter turn of the Geneva 37 and its attached gear 32. Gear 32 is connected, as above explained, to drive the roll shafts 35 and 36. It is to be noted further that the gear 34, on the shaft 36, is larger than the gear 33, whereby the shaft 36 (and its pair of feed rolls 26) move more slowly than the shaft 35 and its feed rolls 27. The first pair of feed rolls 25 receives power intermittently from shaft 36 through a train of gears 40 located outside of the frame A (Figs. 5 and 9). The train 40 includes a gear 41 on the shaft 36, a wide face idler gear 42 in mesh therewith and with a gear 43 fastened on feed roller shaft 44. The train of gears 40 is ratioed so as to give shaft 44 (and its associated feed roller pair 25) a relatively slow speed. The initial drive shaft 39, for the intermittently driven pairs of rollers 25, 26, 27, is driven from a countershaft 45 journaled in the lower frame F by means of a chain and sprocket mechanism indicated generally at 46. The countershaft in turn is driven from the main drive shaft 50 through another chain drive indicated generally at 47 (Fig. 1). As illustrated in Fig. 9, the aforementioned idler gear 42 is journaled to a normally clamped, but adjustable bracket 49. Unclamping of the bracket and swinging it about its pivot on the shaft 36, will withdraw the idler gear from mesh with gear 43 and stop the rotation of the leading pair of rollers 25.

Figure 2:
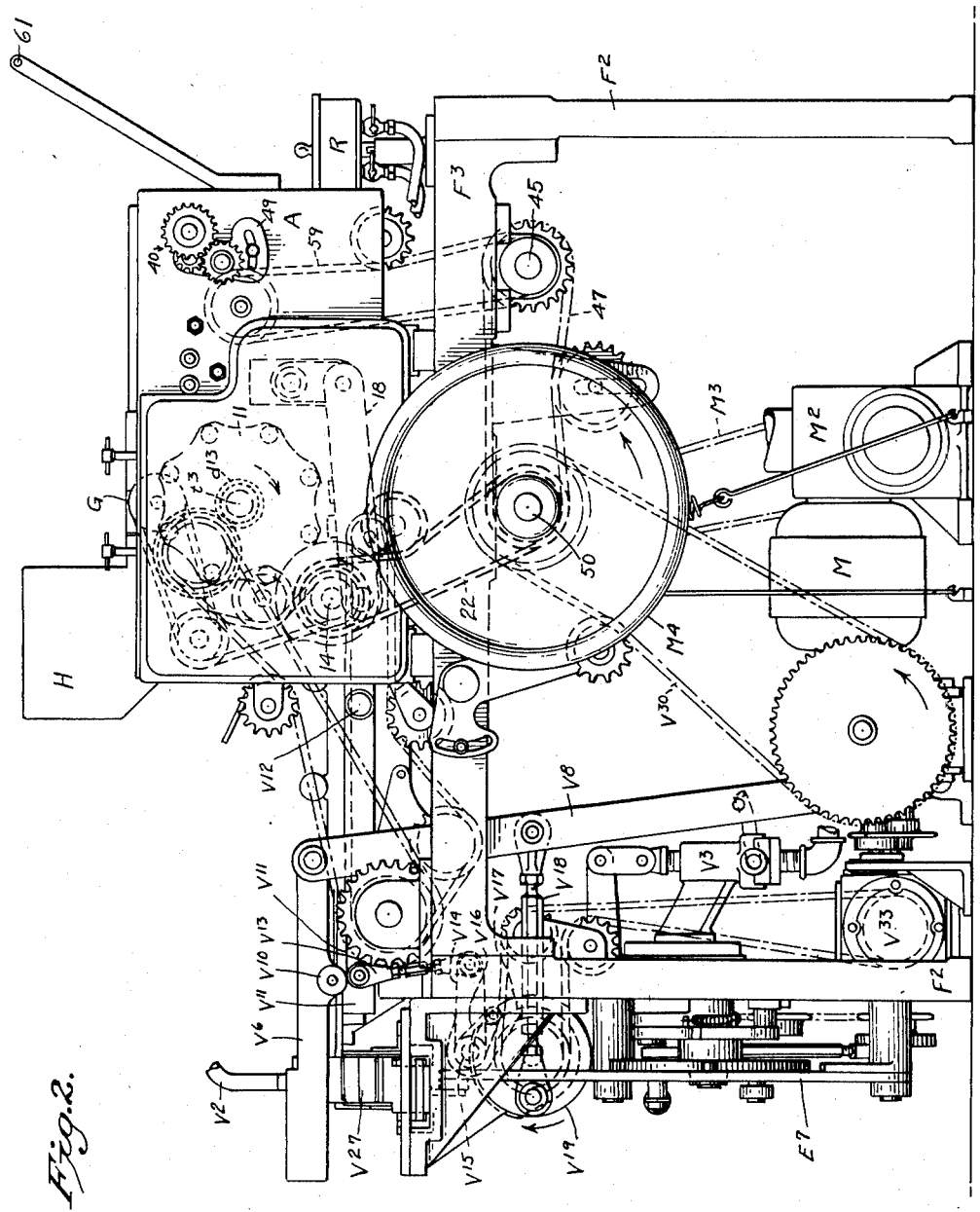
Fig. 2 is a similar view of the left side of the machine.
Figure 10:
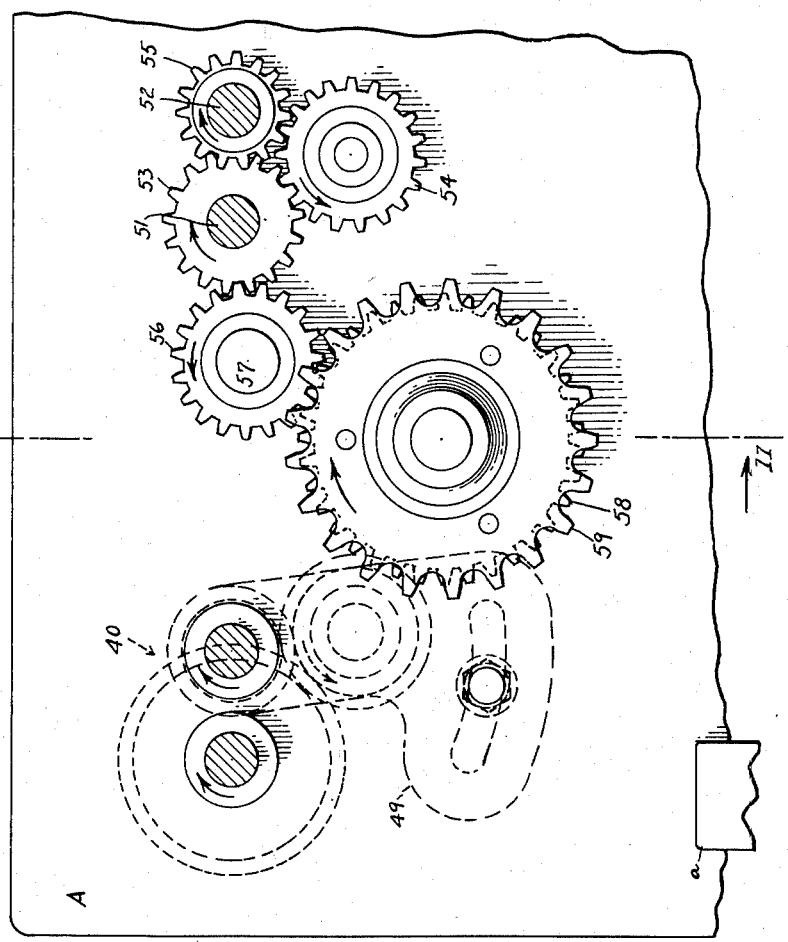
Fig. 10 is an enlarged section on the line 10—10 of Fig. 5.
Figure 11:
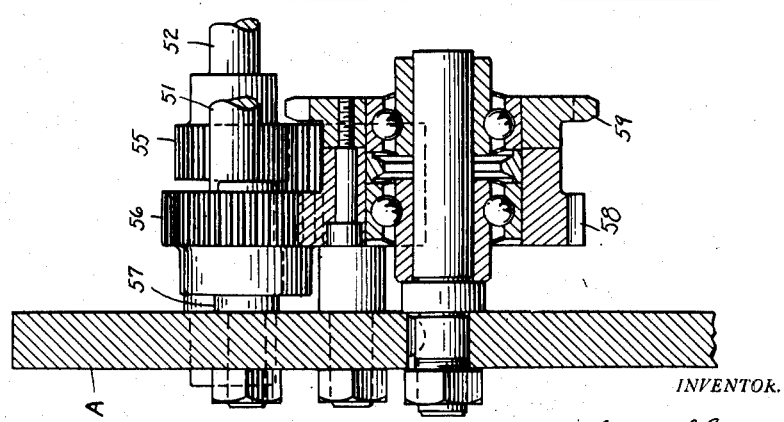
Fig. 11 is a vertical section on the line 11—11 of Figs. 5 and 10.

The drive for the continuously driven pairs of feed rollers 28 and 29 is shown most clearly in Figs. 5, 10, and 11 and includes the roll shafts 51 and 52 that are geared together inside the frame A, by a train composed of gears 53, 54 and 55 of which 54 is an idler. Gear 53 is meshed with another idler 56, on a stub shaft 57. The gear 56 is driven by a gear 58 and a chain and sprocket mechanism indicated at 59 also connected with the countershaft 45 (Fig. 2). The ratioing of the gears 53, 54, and 55, is such as to cause the final pair of feed rollers 29 to revolve faster than their preceding pair 28.

As shown in Figs. 4 and 5, one or more ribbons or slivers of cotton CO, is led over a high bar 61, thence under a guide 62e, into the bight between the upper and lower rolls of the leading pair of rollers 25. The cotton is gripped by the corrugations of the rolls and fed to the second and faster moving pair 26. During the transition, the cottom ribbon is given a first stretching or drafting. After leaving feed rollers 26, the ribbons pass through converging guide channels 62 to the pair of rollers 27, which are propelled intermittently still faster than the pair 26 causing a secondary drafting or alignment of the fibres of the cotton slivers. The cotton sliver on leaving the rolers 27, then enters the bight of the pair of continuously driven pair of rollers 28, whose conjoint action is such as not only to again draft the cotton ribbon but to tear the ribbon into successive patches of unit lengths suitable for swab forming. The rollers 28 feed the detached lengths of cotton to the bight of the final pair of continuously revolving feed rollers 29. Feed rollers 29 revolve, as above indicated, slightly faster than the rollers 28, again producing a slight draft of the torn patches of cotton, and propel the patches rather quickly onto a transversely slotted platform 65 (Fig. 6) positioned somewhat radially of the stick carrier T. A similar guide or shield 66 overlays the platform member 65 and the two members 65 and 66 provide a receiving channel for the cotton patches. The transverse opening 67, which is formed in each of the guides 65 and 66, is arranged in registry with the stick carrying notches $t^6$ provided in the rim of the carrier T. The timing of the intermittent movement of the pairs of feed rollers 25, 26 and 27 is, it will be understood, coordinated with the carrier indexing movements so that a patch of cotton is caused to straddle the opening 67 in the guides 65 and 66, just prior to the passage of the stick therethrough. Approximately simultaneously, the moving stick engages the cotton patch medially of its ends, and draws the same downwardly in a partially folded and wrapped condition about the stick.

In the event that a stick recess in the carrier is empty when passing through the gateway 67, the cotton patch intended for the stick continues to move across the gateway and is removed from the mechanism by cotton pick-up suction tube 67s. The open end of the tube is positioned adjacent the inner ends of the guides 65 and 66, and has its other end connected with any suitable source of suction (not shown). While the machine is running, the suction is applied and the unused cotton patches are immediately withdrawn and discharged into a suitable waste receptacle. A like suction tube is, it will be understood, positioned adjacent the gateway of the companion set of guides, and functions to remove unused bits of cotton as may be necessary.

The tracking guides 62, as illustrated most clearly in Fig. 5, are composed of independently adjustable side wall members 62a, b, c, and d. and function normally to effect a narrowing of the cotton sliver during its movement from rollers 26 to rollers 27. Furthermore, each pair of the guides 65 serve as tracking guides, i. e., guides for steering the cotton slivers outwardly or inwardly, as the case may be, into proper alignment with the ends of the sticks so that the swab will be formed at the proper location thereon.

*Swab forming mechanism—Figs. 1, 3, 4, 6, 12*

On picking up a patch of cotton (Fig. 6), the continued movement of the carrier T, brings a stick with its partially wrapped cotton patch, to the bight between pairs of forming rollers 70, 71 (Fig. 12), and there momentarily rests. Each roller 70a and 70b of the pair of rollers 70, is exteriorly conical in shape, with the larger end 70c of the cone disposed towards the center of the stick and the smaller end of the cone extending beyond the end of the stick. At least one roller such as 70a is formed with a peripheral shouldered portion 70d disposed slightly beyond the stick end, and whose perpendicular wall forms with the side of the conical surfaces of its cooperating roller, an oppositely tapering space 70x, i. e., a tapering space whose larger portion is at and slightly beyond the stick end (see Fig. 12) and whose smaller portion extends toward the center of the stick. At the extreme inner ends of the forming rollers, yieldable, resilient, stick engaging and driving tires 70e and 70f are mounted for rotation with the rollers 70a and 70b. The forming rollers are mounted upon shafts 70g, 70h, and 70j, the latter two shafts terminating adjacent the outside faces of the carrier discs $t^1$, and the former shaft 70g extending across the machine at a position beyond the rim of the carrier. The shaft 70g is journaled in fixed bearings 70k in the frames B and C, whereas shafts 70h and 70j are journaled in bearings provided in arcuately movable supporting brackets 70L, illustrated in Figs. 12 and 13. Each of the brackets 70L is pivoted, as at 70m to the machine frame, and is formed with a depending lever 70n (Fig. 13). A pull spring 70p is connected between the free end of lever 70n and a stationary part of the machine and serves normally to urge the lever 70L and its associated forming roller shaft (70h) clockwise in Fig. 13, the extent of movement being limited by an adjustable stop 70q, provided on each side for that purpose. Each of the extending levers 70n, is also operated upon by an intermittently rocked lever 70r that is mounted upon a rock shaft 70s extending across the machine (see Figs. 3 and 13). The rock shaft 70s carries at its outer end an arcuately adjustable third lever 70t that carries a cam follower roller 70u near its outer end. The follower roller 70u is positioned in the plane of an actuating cam 70v secured to the cam shaft 50, and a pull spring 70w connected between the end of lever 70t and a part of the frame is provided to maintain the roller in engagement with the periphery of the cam. The cam 70v is contoured in a manner operative to rock the shaft 70s intermittently, and which, through levers 70r, 70n, bracket 70L, effects movement of the swab forming roller 70b intermittently toward and away from the fixed forming roller 70a. The movable roller of the pair of rollers 71 is constructed and adapted for intermittent in and out movement in a like manner as will be understood.

The forming roller shafts 70g, 70h and 70j are arranged for continuous rotation by means of chains and sprockets, indicated generally at 70y, that connect the forming roll shafts 70g, 70h, and 70j, with the main shaft 50, sufficient slack being provided in the chain drives to allow for the intermittent spreading action of the forming roll shafts above explained.

*Swab forming action*

As the stick carrier T positions a stick with its partially wrapped patch (or patches) of cotton thereon, between the bight of the swab forming rolls, the latter are held spread slightly apart, by the timed action of the cam 70v, and thereafter immediately close on the stick. The main shaft 50 turns clockwise (Fig. 1) and by reason of the chain connection 70y with the shafts 70g and 70h, drives the forming rolls (in each pair) in the same direction. The swab stick that is held between the rubber tired ends of the forming rolls is caused thereby to rotate in the opposite direction. During the twirling of the stick, the cotton patch (or patches) at the end is confined in the tapering space 70x between the rotating conical sides of adjacent rolls e. g., 70a, 70b, and is progressively wrapped or rolled on the stick. It will be observed that the rubber tired ends 70e and 70f of the forming rolls, frictionally and yieldably engage the bare stick and cause it to twirl at a speed determined by the peripheral speed of the large tired ends of the forming rolls, whereas the cotton, at least the exterior layers thereof is confined between the progressively slower traveling wall-like surfaces of the forming rollers. The speed differential thus brought about causes the cotton to be wrapped around the stick to form a cotton tip whose shape is determined by the contour of the forming rolls. The end face of the swab thus formed is shaped over somewhat spherically by reason of the action of the shouldered portion 70d of one of the forming rollers. It will be further observed that the cotton of an applicator formed in this manner, is wound tightly upon the stick and the various lays of the cotton fibres from the core out adhere to one another somewhat tenaciously by virtue of the drafting that preceded and the action of the forming rollers in wrapping and rolling of the cotton upon the twirling stick. The finished applicators produced by this method of wrapping the cotton are substantially smooth in exterior appearance and uniformly shaped. Moreover, the cotton is rather tightly rolled and compressed which makes it possible to work more cotton into a swab and thus cover the stick better than was possible heretofore. Furthermore, the finished applicator is capable of relatively severe treatment, both before and during use, before becoming deformed or misshapened.

*Forming roll wetting mechanism—Figs. 1, 4 and 12*

The smoothing out and laying of the cotton fibres on the swab may, if desired, be promoted by applying a moistening agent, such as water, simultaneously with the rolling operation. Figs. 1 and 4 illustrate one way of applying moisture which consists in providing a liquid reservoir R having tubes $r^1$ leading to each pair of swab forming rollers. Each tube is provided at its end with a wick $r^2$ that is directed against the surface of one of the rollers preferably the nonshiftable forming roller 70a in a manner such that the rubber tired portion 70e and the conical surface of the forming roller are simultaneously supplied with the moistening agent. The wetting of the rubber tire also aids in the gripping and twirling of the stick.

Figure 3:
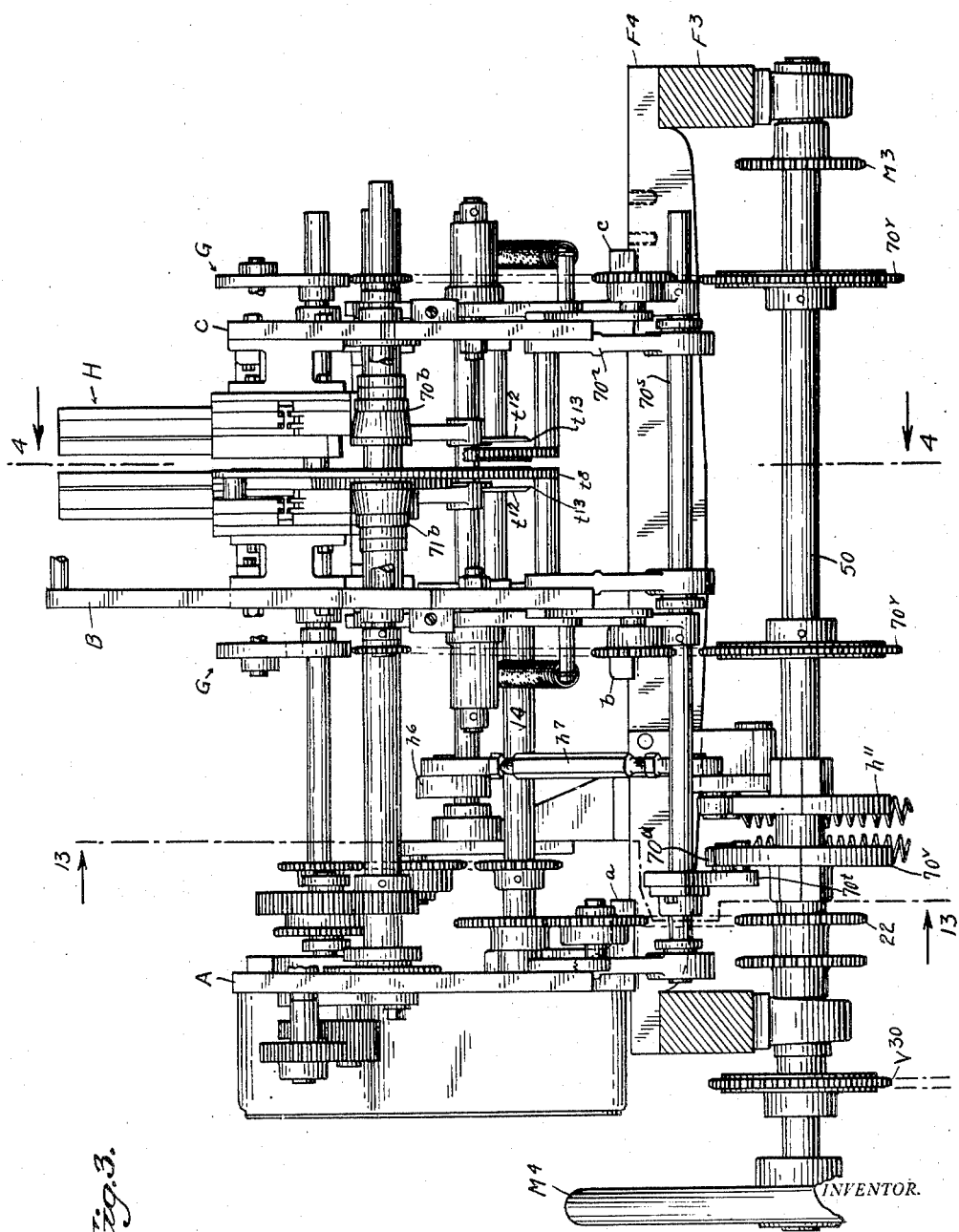
Fig. 3 is a partial front elevation of the upper part of the machine as viewed from the left in Fig. 1.

*Adhesive applicating mechanism—Figs. 1, 3, and 4*

Additionally, a slight amount of paste, glue, or other adhesive may be applied to the stick ends previous to their intercepting patches of cotton. In the instant embodiment an adhesive applying apparatus, indicated generally at G in Fig. 1, is provided at the top of the machine adjacent the second station of the stick carrier away from the loading zone. Preferably, the gluing apparatus comprises a roller $g^1$ whose lower periphery dips into a well $g^2$. The upper periphery of the roll is adapted to be contacted by the stick as the latter arrives at that station. The glue rollers are mounted upon shafts $g^3$ that respectively extend to the outer sides of the plates B and C and carry belt pulleys $g^4$. A pair of belts $g^5$ (one at each side of the machine), drive the respective glue rollers from the stick feeding shaft, marked SF in Fig. 1, that lies adjacent the throat of the stick hopper H.

*Applicator delivery—Figs. 1, 2, 4, 16, 17, 18, 21*

Figure 17:
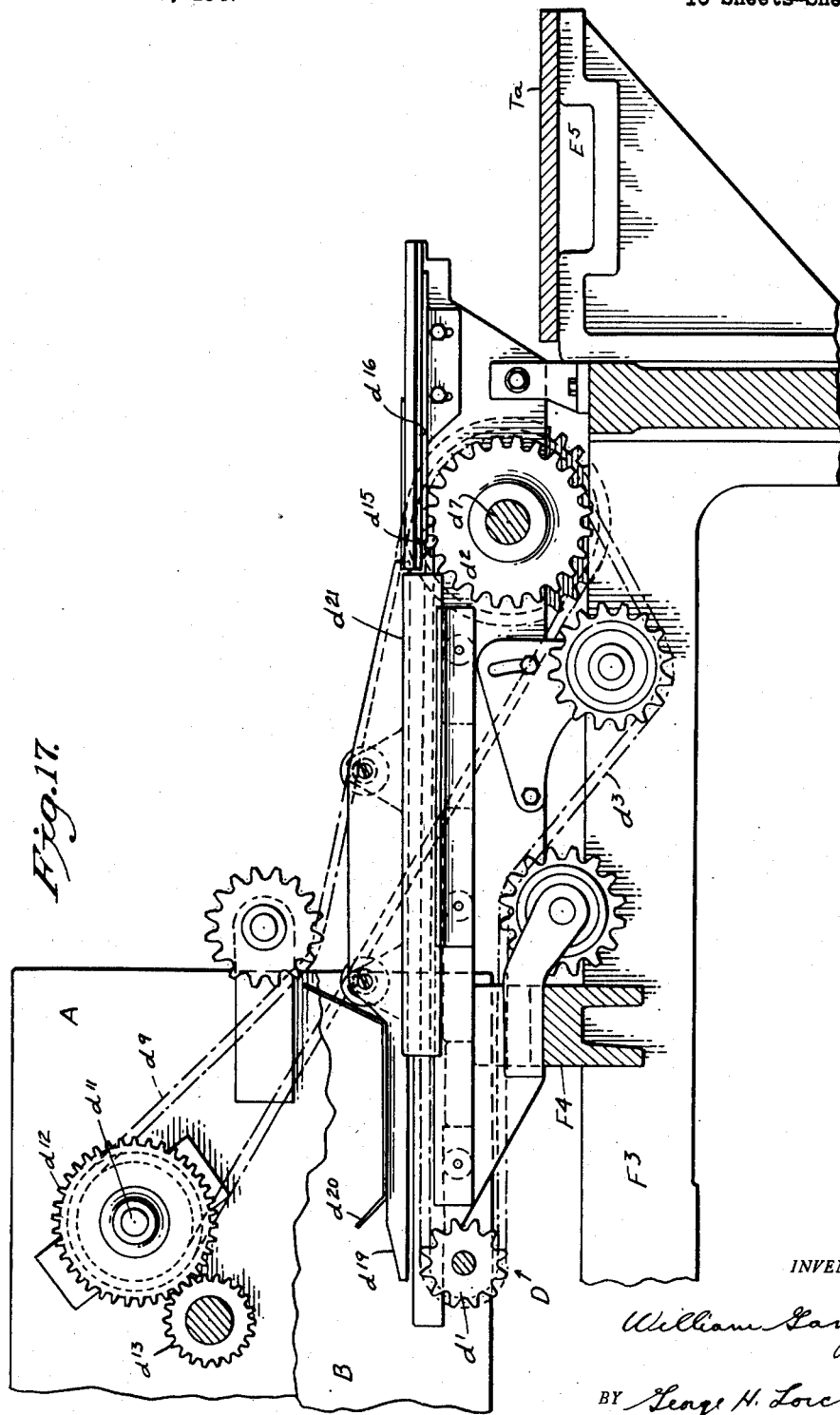
Fig. 17 is a side elevation of the parts shown in Fig. 16.
Figure 18:
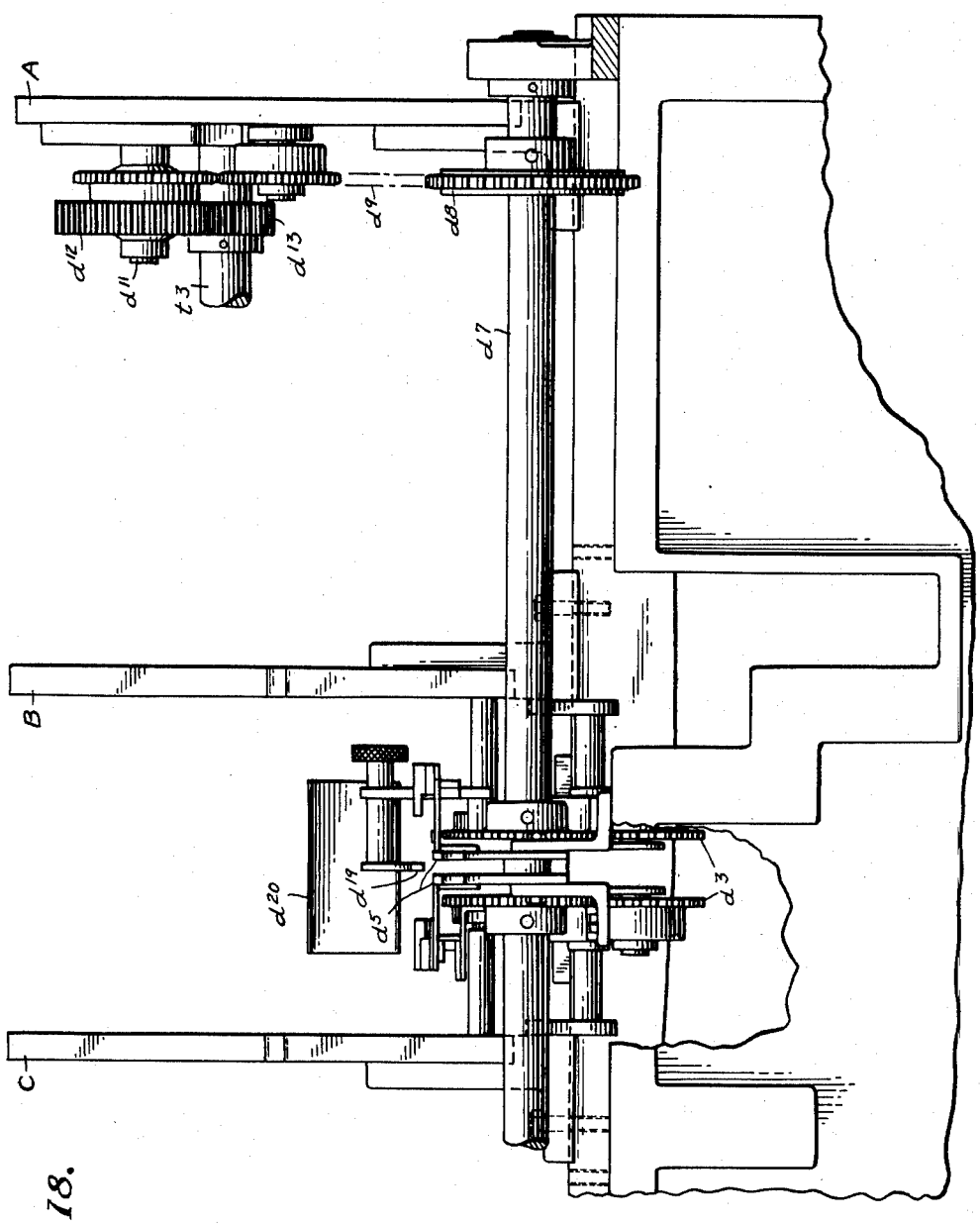
Fig. 18 is an end view of the parts shown in Fig. 17 as viewed from the right with the delivery table omitted.

Upon completion of the swab forming operation the pairs of forming rollers 70, 71 are caused to be spread apart (under the action of the cam 70v) and immediately thereafter the carrier T is indexed. The movement of the carrier removes the completed swab from between the forming rolls and positions another in its place. A further indexing movement of the carrier brings the finished swab to the bottom station thereof (Fig. 4) which coincides with the trailing end of the rim guides $t^8$. In this position the slots $t^6$ in the stick carrying blocks $t^5$ are open and the swab stick is free to fall upon the upper horizontal run of an underlying conveyor, indicated generally at D (Fig. 1). The conveyor is built essentially of one pair of laterally spaced sprockets, $d^1$ journaled one sprocket in each of the frame members B and C, a pair of similarly spaced sprockets $d^2$ journaled both in the frame members $F^3$ in advance of the sprockets $d^1$, and an endless chain arrangement comprising a pair of parallel chains $d^3$ which travel over the sprocket wheels $d^1$ and $d^2$. Each chain is made of abutment links $d^4$ that form uniformly spaced stick-propelling abutments. Two such bands of links are provided, one on each side of spaced parallel tracks $d^5$ (Fig. 16) on and along which the applicator sticks are caused to slide. The pair of sprockets $d^1$, run loose on their respective axles $d^6$, and the driving sprockets $d^2$ are normally tight on a cross shaft $d^7$ that is journaled in the main frame. The shaft $d^7$ also carries a third sprocket $d^8$ over which another chain $d^9$ travels. Chain $d^9$ receives its motive power from a sprocket $d^{10}$ that is journaled upon a stub shaft $d^{11}$ secured to the frame A (Figs. 16 and 17). The sprocket $d^{10}$ is fast with a gear $d^{12}$ that meshes constantly with a pinion gear $d^{13}$ mounted upon the carrier index shaft $t^3$ (Figs. 2 and 17). From the foregoing it will be seen that the conveyor derives its motive power from the stick carrier index shaft and hence moves intermittently in synchronism therewith. The movement of the conveyor is such as to move the conveyor chains in one link increments as such increments of movement bring the spaces between adjacent pairs of links $d^4$ successively under and into alignment with the open stick slots in the carrier as the latter arrive successively at the stick delivery station. With the parts so related, a finished applicator on reaching its lower-most station of the carrier index movement, falls out of the carrier into the notch between two adjacent abutment links and on the next movement is shifted laterally along conveyor tracks $d^5$. Should any stick and its applied cotton fail to fall from the carrier, means are provided to insure removal therefrom. A preferred form of device for that purpose is illustrated more clearly in Figs. 3 and 4 and comprises a pair of plates $t^{12}$ fixedly supported, one at each outer side of the carrier plates $t^1$ and closely spaced therefrom. The lower edges $t^{13}$ of the plates are positioned as to lie tangent to the inner rim of the stick slots $t^6$ and extend beyond the rim of the carrier, forward of its axis of rotation. As the carrier indexes, any contained stick is caused to engage the under side of the plates and be cammed thereby out of its slot and onto the conveyor.

Figure 21:
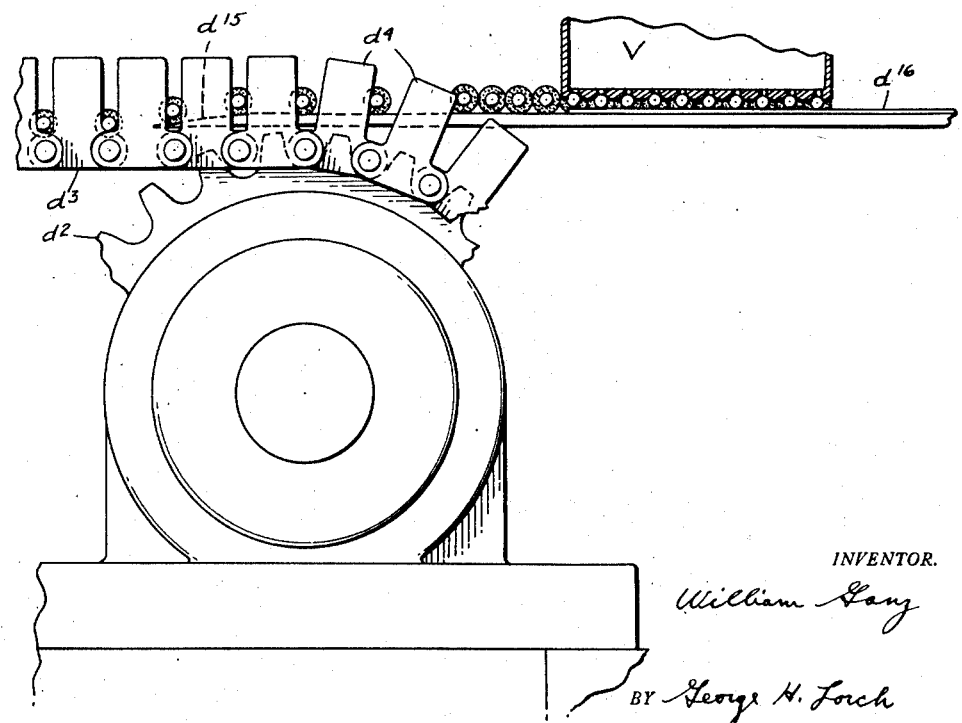
Fig. 21 is an enlarged vertical detail section at the delivery end of the machine showing the vacuum head in its forward position engaging the applicators in order to transport them into the path of the bag loading mechanism, and showing the end of the conveyor which positions the applicators on a table extending beneath the vacuum head.

After a series of indexing movements of the conveyor, the completed swab sticks are brought successively to the end of the upper run of the conveyor where a tapered removal finger $d^{15}$ effects lifting of the sticks out of the notches in the chain and deposits them upon an accumulator shelf $d^{16}$. Fig. 21 illustrates the relation and the construction of the removal finger $d^{15}$ most clearly. The accumulator shelf $d^{16}$ is in effect a continuation of the removal finger $d^{15}$ and the finished swab sticks are caused to be stacked thereon, in a single layer, side-by-side by the successive advancing action of the finished applicators. During the intermittent motion of the conveyor, the applicators are restrained from endwise shifting in the chain slots by means of end guide members $d^{17}$ and $d^{18}$, and from riding up in the slots by a top-guide bar $d^{19}$. A shield $d^{20}$ attached to the guide bar $d^{19}$ protects the finished applicators from droppings from the stick carrier and a cover $d^{21}$ encloses the finished applicators during the major portion of their travel with the conveyor to the accumulator table $d^{16}$.

*Packaging mechanism—Figs. 1, 2, 19, 20 and 21*

Figure 20:
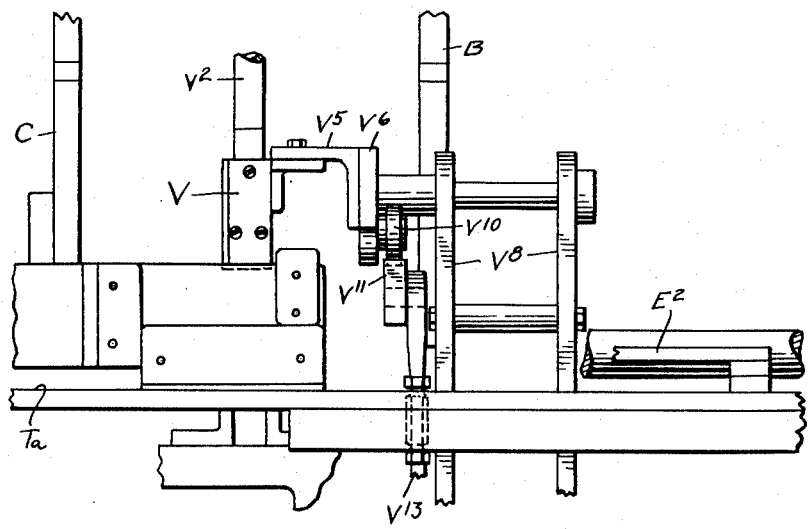
Fig. 20 is an enlarged detail end view of the delivery end of the machine as viewed from the right in Fig. 1, and showing the vacuum head, its track and connections.

In order that the finished applicators be packaged unhandled by the machine attendant, means have been embodied operative automatically to pick up a pre-selected number of the finished applicators and deposit them into a loading trough. After a succession of pick-up cycles, the contents of the trough is automatically discharged into a bag or other suitable container and the container sealed or otherwise closed by appropriate means. Referring more particularly to Figs. 1 and 20, the pick-up mechanism in the instant embodiment includes a mobile vacuum head V having a suction tube connection $V^2$ connected with a control valve $V^3$ located in the base of the machine. The valve $V^3$ in turn is suitably connected with a source of vacuum $V^4$. The applicator pick-up head is a hollow box-like member having a perforated bottom and is mounted to a bracket $V^5$ carried at the side of a reciprocal arm $V^6$. The arm $V^6$ is pivotally secured as at $V^7$ to the upstanding end of an actuating lever $V^8$, whose lower end is pivoted to a bracket $V^9$ in the base of the machine. The bar $V^6$ also carries intermediate its ends a roller $V^{10}$ (Fig. 20) which is arranged to overlie and ride upon a cam track $V^{11}$. The track $V^{11}$ is pivoted at its inner end as at $V^{12}$ to the machine frame work and at its outer end to an actuating link member $V^{13}$ and the link $V^{13}$ is connected to the free end of an oscillatable arm $V^{14}$ carried by a shaft $V^{15}$. The shaft $V^{15}$ carries a second arm $V^{16}$ that mounts a cam follower positioned in operative relation to a rotatable cam $V^{17}$ (Fig. 2). As the cam $V^{17}$ revolves, the arms $V^{14}$ and $V^{16}$ are oscillated an amount proportioned to the throw of the cam which movement is transmitted to the track member $V^{11}$ by the rigid link connection $V^{13}$. By these connections and mechanisms the vacuum head cam track $V^{11}$ is caused to rise and fall predetermined amounts at selected intervals in the cycle. As above indicated, the vacuum head carrying bar, by means of its roller $V^{10}$, operates back and forth on the cam track, the reciprocating motion being imparted by means of a connecting rod element $V^{18}$ that is connected between the oscillatable lever $V^8$ and a crank disc $V^{19}$. The cam $V^{17}$ and crank disc $V^{19}$ are fast on a shaft $V^{20}$ that is journaled in bearings $V^{21}$ provided at the delivery end of the machine. This cam shaft $V^{20}$ also carries a driving sprocket $V^{22}$ and another cam $V^{23}$ at its end. The cam $V^{23}$ is tracked by a roller $V^{24}$ mounted to one end of a pivoted lever $V^{25}$. The other end of lever $V^{25}$ is operatively connected to the stem $V^{26}$ of the vacuum control valve $V^3$ previously referred to. Upon rotation of the cam shaft $V^{20}$, the vacuum control valve is intermittently operated and the air intermittently exhausted from the vacuum head V. Synchronously operating, however, are the slide elevating cam $V^{17}$ and vacuum head reciprocating crank disc $V^{19}$ whose combined functions cause the vacuum head to recede to a position above the accumulator table and the sticks thereon, then lower and pick up a selected number of sticks, then transport the sticks to the packaging trough $V^{27}$ whereupon the valve $V^3$ is operated to cut off the vacuum and the sticks as caused to fall into the trough. This cycle is repeated a given number of times so that the trough becomes loaded with the required number of finished applicators before the ejector mechanism operates. The drive power for operating the vacuum head is derived initially from the main drive shaft 50, through the medium of a sprocket and chain drive indicated generally at $V^{30}$ with a first speed reducing unit $V^{31}$, thence, via another chain drive indicated at $V^{32}$ to another transmission unit $V^{33}$ and thence via chain $V^{34}$ to the sprocket $V^{22}$ on the cam shaft $V^{20}$. The speed reduction unit mentioned is of the usual worm and worm wheel design and does not require elaboration.

Figure 19:
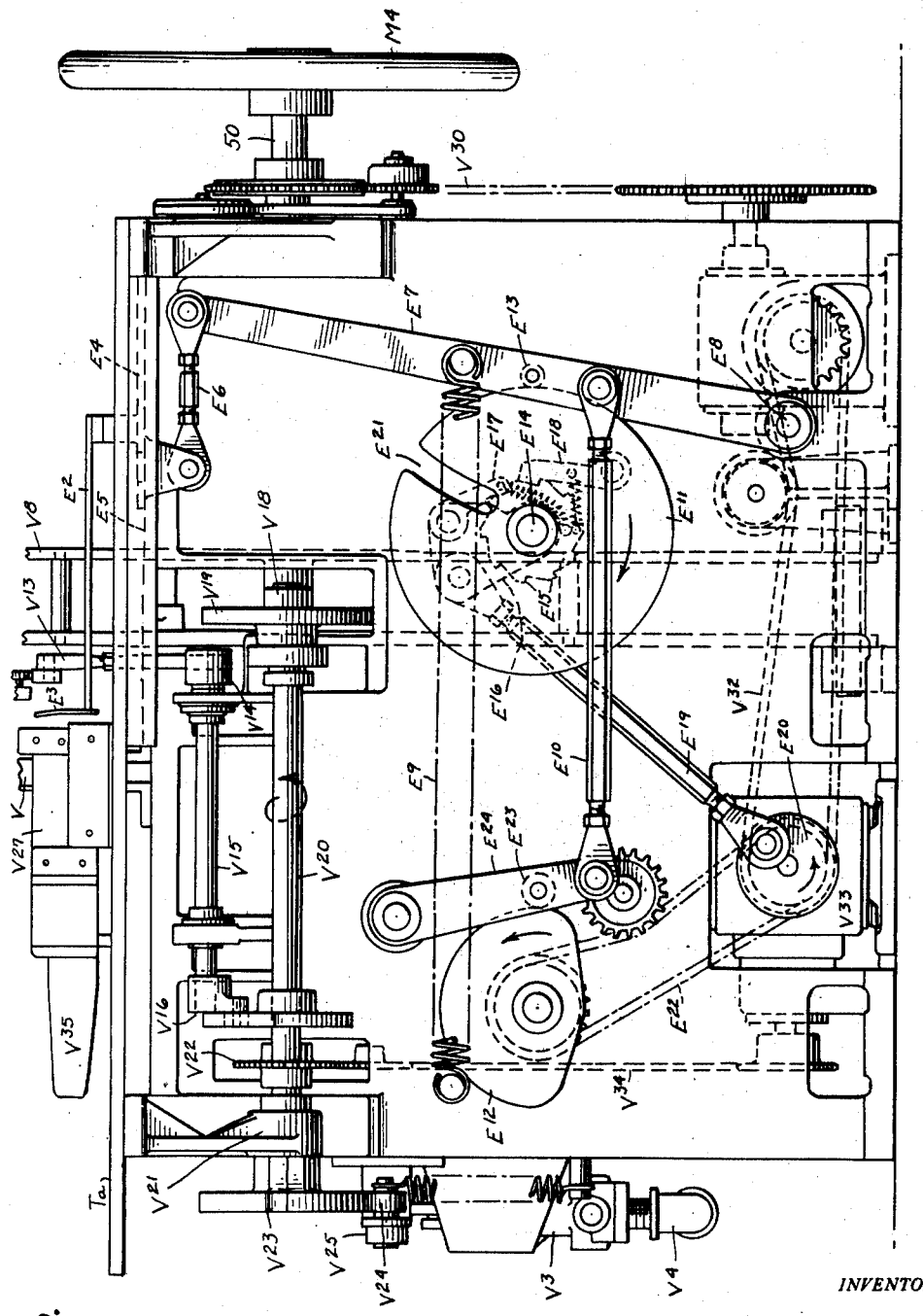
Fig. 19 is an enlarged rear end elevation of the lower part of the machine as viewed from the right in Fig. 1, showing the means for operating the delivery mechanism.

*Ejector mechanism—Figs. 1, 2, and 19*

The ejector mechanism is disclosed more fully in Fig. 19 and comprises a rectilinearly movable pusher bar $E^2$ whose head end $E^3$ is slidingly fitted to and operates normally within the applicator receiving trough $V^{27}$. The rear end of the bar is secured to a slide $E^4$ that is mounted in slideways $E^5$ located under the work table $T^a$, a slot $t^a$ being provided in the table through which the connection is made. The under side of the slide is connected by a short link $E^6$ to the upper end of an intermittently oscillated lever $E^7$. The lever $E^7$ is pivoted at its lower end as at $E^8$ to a base bracket. Oscillation of the lever $E^7$ in an operative direction is caused by a pull spring $E^9$, and in retracting or resetting direction by a rigid link $E^{10}$. The spring $E^9$ is connected between the lever and a stationary part of the frame and tends normally to urge the lever $E^7$ to the left (in Fig. 19), which movement is resisted in part by a slotted counter disc $E^{11}$ and in part by a disc cam $E^{12}$. The disc $E^{11}$ is tracked throughout the major portion of its periphery by a roller $E^{13}$ mounted on the side of the lever $E^7$, and is intermittently indexed by a ratchet and pawl mechanism. The counter disc is rotatively mounted upon a shaft $E^{14}$ journaled in the main frame and carries a toothed ratchet wheel $E^{15}$. The shaft $E^{14}$ provides a pivotal axis for a pawl carrier $E^{16}$. A drive pawl $E^{17}$ is pivoted to the carrier and operates to engage the teeth of the wheel $E^{15}$ and move the latter at least one tooth on each oscillatory movement. A keeper pawl $E^{18}$ is also arranged to operate on the toothed wheel to prevent retrogressing of the latter on a resetting movement of the drive pawl. Oscillation of the pawl carrier is caused by a rigid connecting link $E^{19}$ pivoted at one end to the carrier $E^{16}$ and its other end to a crank disc $E^{20}$ that extends from the aforementioned transmission unit $V^{33}$. In the embodiment illustrated, the ratchet is formed with 10 teeth, wherefore 10 indexing movements of the counter disc $E^{11}$ are required to effect a single revolution thereof. In the position of the parts illustrated in Fig. 19, the pusher rod $E^3$ is held in retracted position by the roller $E^{13}$ abutting the periphery of the disc $E^{11}$. However, when the slot $E^{21}$ provided in the disc is advanced to a position in registry with the roller $E^{13}$, the latter is moved into the slot under the pull of the spring $E^9$. This action causes lever $E^7$ and the pusher $E^2$, $E^3$ to move quickly to the left (in Fig. 19) and causes the ejection of the sticks from the trough $V^{27}$. The pusher member is immediately retracted by the cam $E^{12}$, which is also driven from the transmission unit $V^{33}$ via a chain drive $E^{22}$. The cam $E^{12}$ is tracked by a roller $E^{23}$ mounted upon a pivoted lever $E^{24}$ and the latter has the aforementioned rigid link $E^{10}$ connected therewith as shown in Fig. 19. The cam $E^{12}$ it will be observed is formed with a low and a high portion and is driven in synchronism with the counter disc $E^{11}$ and at such rate that the low portion arrives opposite the roller $E^{23}$ whenever the slot $E^{21}$ in the counter disc arrives opposite the roller $E^{13}$ on the pusher lever. However, before the counter disc is again indexed, the continuous turning of the cam $E^{12}$ propels the roll $E^{23}$, link $E^{10}$, lever $E^7$ etc., to the right whereby the pusher is retracted and the pusher roll $E^{13}$ withdrawn from the slot in the counter disc.

With the vacuum head and ejector mechanism and parts related as just explained, the vacuum head will be caused to perform 10 pick up and delivery operations for each one ejector cycle. Accordingly, if the vacuum head is constructed to pick up 10 applicators on each operative stroke, 100 such applicators will be deposited in the delivery trough before the ejector mechanism functions.

As illustrated partially in Fig. 19, the delivery trough $V^{27}$ is provided with extending flanges $V^{35}$ (only 1 shown). Preferably, three such flanges are embodied, each being slightly flexible and tapered toward its free end, and the three being arranged to form continuations of the bottom and two sides of the delivery trough. Preferably also, the flanges are slightly inwardly directed to form not only a converging walled trough, but an exteriorly tapering guide over which the attendant may conveniently and quickly slide a bag or other container. As the ejector advances a load of applicators, the tapering flanges are caused to expand outwardly thereby fully opening the bag and depositing therein the selected quantity of swabs. The container filled with the swabs is thereafter withdrawn from the flanges and the open end closed in any suitable way, e. g., heat sealing.

*Main cam shaft drive—Figs. 1, 2, 3*

Power to drive the entire machine is conveniently furnished by a motor M located in the base of the machine and which is controlled preferably by a master switch MS and the two serially arranged start and stop switches SS. The switches SS are provided and located for the convenience of the attendant in operating the machine, one of the control switches being located at the cotton feeding end of the machine and the other at the delivery end of the machine. The transmission from the motor M to the main shaft 50 includes in the instant embodiment a speed reducing unit $M^2$, of standard worm and worm wheel design, connected directly with the motor, and a chain and sprocket drive, indicated generally at $M^3$, connecting the output end of the reducer with the main shaft 50. To facilitate the making of adjustment etc., the main shaft 50 is provided with a relatively large hand wheel $M^4$, located exteriorly of the frame by which the various mechanisms may be turned over slowly manually and stopped at any desired point.

As hereinbefore mentioned, the auxiliary frame members A, B and C are supported by cross members $F^4$ of the main frame, and the member C is constructed and arranged for lateral adjustment on the cross bars. By providing such adjustability, the frame may be repositioned toward or away from the frame B and thereby vary the spatial distance therebetween. These frames provide journal bearings and supports for the cotton feeding and drafting roll shafts 36, 44, 51, 52 turret plate carrying shaft $t^3$, forming roll shaft $70^g$, $70^h$, and $70^j$ and their related driving sprockets (see Figs. 3, 5, 8, 12) and also portions of the delivery conveyor namely the pairs of sprockets $d^1$ and $d^2$, tracks $d^5$, guides $d^{17}$, $d^{16}$ and $d^{19}$ (see Figs. 16, 17, 18), so that when the machine is opened up, by spreading the plates B and C, it is opened up from one end to the other. Longer or shorter sticks may thereby be run through and have swabs formed on one or both ends as hereinbefore explained. The plates B and C are slidably mounted on the various transverse shafts which are supported at their ends in the side frames of the machine. The arrangement is such that the plates B and C are laterally adjustable with respect to each other so that the various operating elements thereon can be spaced as desired to accommodate sticks of different lengths.

*Operation*

The operation of the machine in its entirety briefly is as follows: The attendant having previously adjusted the spacing of the plates B and C and made the adjustments necessary for the forming of the applicators of selected length, starts the machine in operation by closing switch MS and one of the auxiliary switches SS. The strips or slivers of cotton Co are then fed over the bar 61 and under bar 62e to the bight of the leading pair of drafting rolls 25. Thereafter, the cotton is fed and worked by the succeeding pairs of rolls 26, 27, 28, 29, and delivered in short lengths to the guides 65 and 66 adjacent the stick carrier. Sticks are fed from the hopper and successively placed in the peripheral notches of the carrier and carried through the gate 67 to the forming rolls 70, 71. In passing through the gateway the stick ends engage the patches of cotton and carry them in partially wrapped condition to the forming rolls, which are at that instant open. When the stick and its cotton patches are in wrapping position, the forming rolls close and the twirling of the stick and the rolling and forming of the swabs proceeds. In a comparatively short interval the swab forming is completed, the forming rolls open, and the finished applicator is finally indexed to the delivery station where it falls upon the conveyor mechanism D. The conveyor brings the finished applicators and stacks them upon the accumulator table in position to be picked up by the vacuum head V. After a group of finished applicators has accumulated, the vacuum head retracts and lowers upon the sticks medially of their ends, picks up a group and transports them to the delivery trough V²⁷. The pick-up cycle is repeated until the trough contains the requisite number of applicators whereupon the ejector E³ propels the group into a container applied to the tapering guides V³⁰.

It will be understod, of course, that the various cooperating mechanisms that handle the cotton, sticks and finished swabs are driven in synchronism and at speeds correlated to the operations performed, and as all of such cooperating mechanisms are preferably gear and chain driven and derive their power from a common source namely, shaft 50, they perform their cycles of operations in properly timed relation. A machine constructed as disclosed herein has the capacity to draft the cotton, feed the sticks, and precision form swabs and package the finished aplicators at a rate of approximately 13,000 units per hour, which is a production rate exceeding any known prior method or machine.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptions should be and are intended to be comprehended within the meaning and range of equivalency of the following claims.

Having thus revealed this invention, I claim as new and desire to secure the following combinations and elements or equivalents thereof, by Letters Patent of the United States:

1. In a cotton tipped applicator making machine of the character described, a stick supply, a cotton patch supply, a set of opposed stick twirling and cotton wrapping and shaping rolls, means for feeding sticks from said supply successively to the bight of said set of stick twirling rolls, means operative to feed patches of cotton successively to a position across the path of movement of the sticks so as to be engaged by the respective sticks and carried therewith into the bight of the wrapping and shaping rolls, and means for rotating said set of rolls to effect a twirling of a stick and a wrapping of the patch thereon to form a swab on the end of the stick.

2. In a cotton tipped applicator making machine of the character described, a stick supply, a cotton patch supply, two sets of opposed stick twirling and cotton wrapping and shaping rolls, means for feeding sticks from said supply successively to the bight of said sets of stick twirling rolls, means operative to feed patches of cotton successively to a position across the path of movement of each end of the sticks so as to be engaged by the ends of the respective sticks and carried therewith into the bight of the wrapping and shaping rolls, and means for rotating said sets of rolls to effect a twirling of a stick and a wrapping of the patches thereon to form a swab upon each end of the stick.

3. The combination of claim 2 characterized by the provision of means for adjusting one of said sets of stick twirling and cotton wrapping and shaping rolls in an endwise direction relative to the other set to adapt the machine to any of a range of stick lengths.

4. In a swab making machine of the character described, means for applying a patch of cotton to an end of a stick, said means comprising in part a pair of relatively closely spaced roll members having stick engaging portions and cotton tip forming portions and in part a rotatable stick supporting member, means for moving the stick supporting member from a loading station to a position adjacent the bight of said rolls and for maintaining said stick member momentarily in said last named position and thereafter to move said member away from the bight of said rolls, and means for rotating said roll members whereby to effect rotation of a stick contained by the stick supporting member during the period the stick is in the bight of said rolls.

5. The combination set forth in claim 4 in which said roll members are mounted on parallel axes and arranged for relative movement in a lateral direction whereby to alter the gap between their adjacent peripheries, and means synchronized with the movement of the stick supporting member for moving one of the rolls laterally in a direction enlarging the gap between the rolls on completion of the cotton tip forming operation whereby to facilitate the passage of a stick therethrough.

6. The combination of claim 4 in which said roll members are provided with a stick engaging surface composed of rubber or the like material.

7. In a machine for making applicators of the character described, means for applying a patch of cotton to the end of a stick, said means comprising in part a rotatable carrier member having opensided recesses in its periphery adapted to contain and transport sticks to be wrapped and in part a pair of rotating rollers having stick engaging portions and cotton wrapping portions, said rollers being mounted on parallel axes that lie in a plane that includes the axis of said rotatable carrier, said rollers being positioned relative to the path of movement of the recesses in said carrier so that the bight formed by adjacent peripheries of said rollers is substantially coincident therewith, means for imparting movement to said carrier intermittently whereby to position said carrier recesses successively in substantial coincidence with the bight of said rollers, and means for rotating said rollers and for causing said rollers yieldingly to engage a stick positioned in the bight thereof by a movement of said carrier and to effect rotation of the said stick and wrapping of the cotton on one end of said stick during the period of carrier dwell.

8. The combination set forth in claim 7 including means operatively associated with the said rollers for limiting the extent of yield movement in a stick engaging direction to suit the size of the stick.

9. A machine for wrapping a piece of cotton on the end of a stick, comprising a pair of cooperating stick twirling rolls, said rolls having stick engaging and twirling portions and cotton engaging and wrapping portions, means operative to insert a stick and a piece of cotton into the bight of said rolls, and means to revolve said rolls in the same direction thereby to effect twirling of the stick by said first named portion of the rolls and a wrapping of the cotton thereon by said second named portions of said rolls.

10. A machine for wrapping a piece of cotton on a stick to form a swab, comprising a pair of cooperating rolls each having peripheral straight and relieved portions opposite one another adapted to engage a stick with which there is associated a piece of cotton confined in the space provided by the relieved portions of the rolls, and means to rotate said rolls whereby to effect a twirling of the stick and a wrapping of the cotton thereon to form a swab of the size and character determined by the contour of the relieved portions of said rolls.

11. In a cotton tipped applicator making machine of the character described, a stick supply, a cotton patch supply, a set of opposed stick twirling and cotton wrapping and shaping rolls, means for feeding sticks from said supply successively to the bight of said set of rolls, means operative to feed patches of cotton successively to a position across the path of movement of the sticks so as to be engaged by the respective sticks and carried therewith into the bight of the rolls, and means for rotating said set of rolls to effect twirling of the stick and wrapping of the patch thereon, said rolls having opposed portions of their peripheries relieved to form an enlarged opening therebetween to accommodate the cotton and form a tip thereof at the end of the stick.

12. A machine for forming a cotton tip at the end of a stick, comprising a pair of closely spaced rotatable rolls arranged on parallel axes and having opposed portions of their peripheries relieved to form an enlarged opening therebetween, a carrier movable to position a stick parallel with the axes of the roll and with an end portion thereof in the bight between the rolls and adjacent said enlarged opening, means for causing a patch of cotton to be positioned around said stick end as the stick is moved to position between the rolls, and means for twirling the stick when thus positioned and as the rolls are rotated to form a cotton tip on the stick with shape determined by the contour of the relieved portions in the peripheries of the rolls.

13. A machine for forming a cotton tip at the end of a stick, comprising a pair of closely spaced rolls arranged on parallel axes for rotation in the same direction and having opposed portions of their peripheries relieved to form an enlarged opening therebetween, a carrier movable to position a stick parallel with the axes of the roll and with an end portion in the bight between the rolls and adjacent said enlarged opening, means for causing a patch of cotton to be positioned around said stick end as the stick is moved to position between the rolls, and means for twirling the stick when thus positioned and as the rolls are rotated to form a cotton tip on the stick with shape determined by the contour of the relieved portions in the peripheries of the rolls.

14. A machine for forming a cotton tip at the end of a stick, comprising a pair of closely spaced rotatable rolls arranged on parallel axes and having opposed portions of their peripheries relieved to form an enlarged opening therebetween, a carrier movable to position a stick parallel with the axes of the roll and with an end portion thereof in the bight between the rolls and adjacent said enlarged opening, means for causing a patch of cotton to be positioned around said stick end as the stick is moved to position between the rolls, and means on the rolls for twirling the stick when thus positioned and as the rolls are rotated to form a cotton tip on the stick with shape determined by the contour of the relieved portions in the peripheries in the rolls.

15. A machine according to claim 12 in which the rolls are relatively yieldable to admit the stick into the bight therebetween.

16. A machine according to claim 12 in which the rolls are relatively movable in a direction to increase the space between their peripheries to admit the stick into the bight between the rolls.

WILLIAM GANZ.

REFERENCES CITED

The following references are of record in the file of this patent:

UNITED STATES PATENTS

| Number | Name | Date |
|---|---|---|
| 1,721,815 | Gerstenzang | July 23, 1929 |
| 1,921,604 | Bunnell et al. | Aug. 8, 1933 |
| 2,228,599 | Glickston | Jan. 14, 1941 |
| 2,253,852 | Glickston | Aug. 26, 1941 |
| 2,430,648 | Schonrock | Nov. 11, 1947 |
| 2,445,884 | MacManus | July 27, 1948 |
| 2,544,125 | Bain et al. | Mar. 6, 1951 |